US012646935B2

(12) United States Patent
Mariyappan et al.

(10) Patent No.: US 12,646,935 B2
(45) Date of Patent: Jun. 2, 2026

(54) BATTERY HOT SWAPPING

(71) Applicant: QUALCOMM Incorporated, San Diego, CA (US)

(72) Inventors: Vignesh Mariyappan, Trichy (IN); Anand Kumar Kalairaj, Bengaluru (IN); Prashanth Kumar Kakkireni, Bengaluru (IN); Amit Das, Bengaluru (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/188,971

(22) Filed: Mar. 23, 2023

(65) Prior Publication Data

US 2024/0322562 A1     Sep. 26, 2024

(51) Int. Cl.
| | |
|---|---|
| *H02J 7/34* | (2006.01) |
| *H02J 1/00* | (2006.01) |
| *H02J 7/00* | (2006.01) |
| *H02M 1/00* | (2006.01) |
| *H02M 3/158* | (2006.01) |

(52) U.S. Cl.
CPC ............ *H02J 1/001* (2020.01); *H02J 7/0068* (2013.01); *H02J 7/345* (2013.01); *H02M 1/0045* (2021.05); *H02M 3/158* (2013.01); *H02J 7/0048* (2020.01)

(58) Field of Classification Search
CPC .. H02M 1/0045; H02M 3/158; H02M 3/1582; H02M 3/1584; H02M 3/1586; H02M 3/155; H02M 3/1552; H02M 3/156; H02M 3/1566; H02J 7/0068; H02J 7/0069;

(Continued)

(56) References Cited

U.S. PATENT DOCUMENTS

2004/0113585 A1 *   6/2004   Stanesti ................... H02J 7/02
                                                              320/116
2018/0083535 A1      3/2018   Ni et al.
                    (Continued)

FOREIGN PATENT DOCUMENTS

EP            4135141 A1     2/2023
WO       2016210157 A1     12/2016

OTHER PUBLICATIONS

International Search Report and Written Opinion—PCT/US2024/017619—ISA/EPO—Jun. 17, 2024.

*Primary Examiner* — Nguyen Tran
(74) *Attorney, Agent, or Firm* — Patterson & Sheridan LLP

(57) ABSTRACT

Techniques and apparatus for swapping a primary power source (e.g., a main battery) while using a secondary power source (e.g., a backup battery or a supercapacitor) to power a portable device. One example integrated circuit (IC) for power management generally includes a first power supply node; a second power supply node; a first port for coupling to a primary power source; a first switch coupled between the first power supply node and the first port; a second port for coupling to a secondary power source; a second switch coupled between the first power supply node and the second port; and a third switch coupled between the first and second power supply nodes. For certain aspects, the IC also includes a third power supply node, a voltage regulator coupled between the first and third power supply nodes, and a fourth switch coupled between the second and third power supply nodes.

11 Claims, 20 Drawing Sheets

(58) Field of Classification Search
CPC ........ H02J 7/007; H02J 7/00714; H02J 7/345;
H02J 7/0048; H02J 7/0063
See application file for complete search history.

(56)                    References Cited

U.S. PATENT DOCUMENTS

2018/0123385 A1*   5/2018   Akiyama  ................ H02J 7/007
2020/0067335 A1*   2/2020   Lim  ....................... H02J 7/0068
2020/0127467 A1*   4/2020   Li  ........................... H02J 7/342

* cited by examiner

FIG. 5

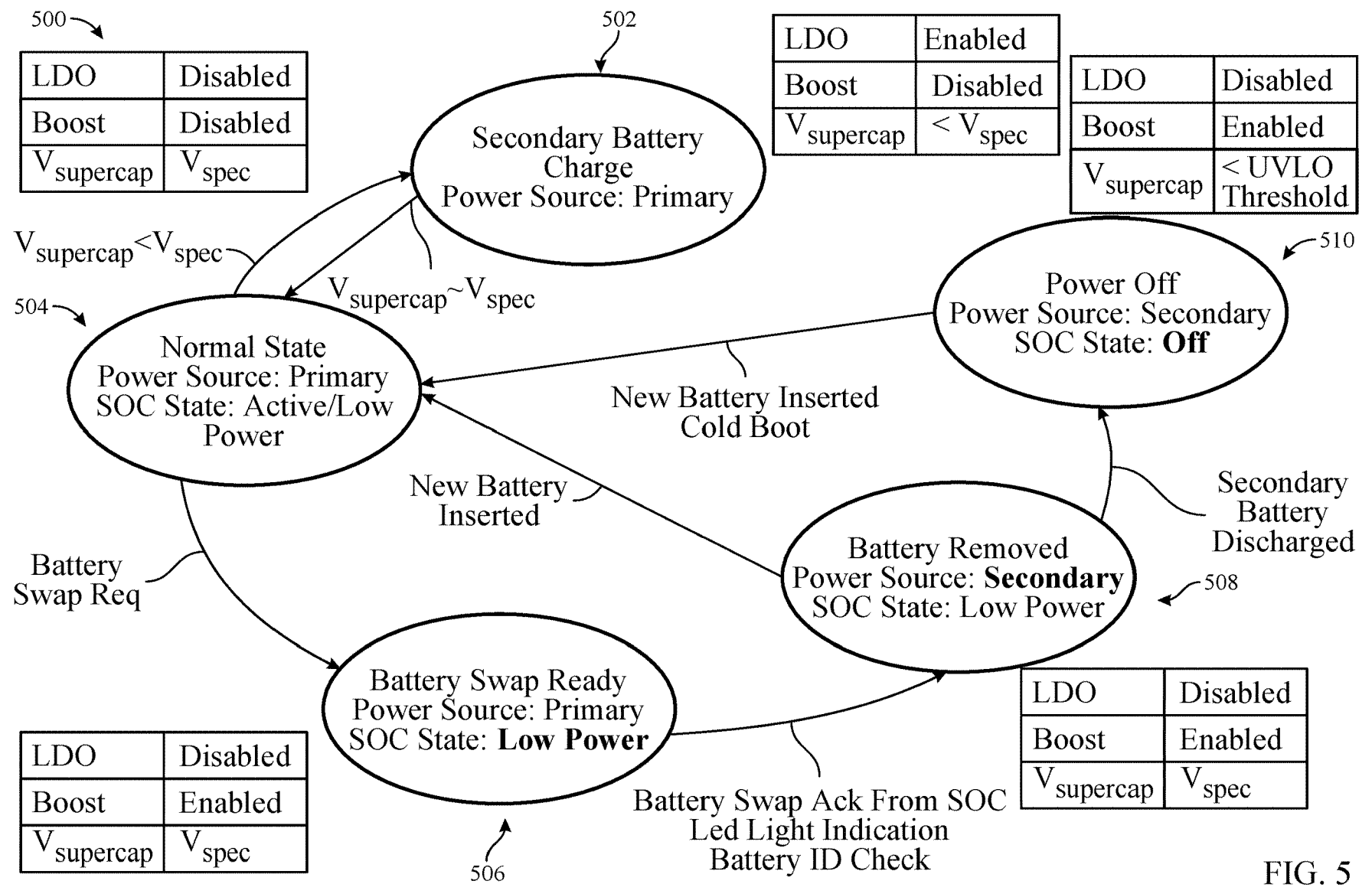

| LDO | Disabled |
|-----|----------|
| Boost | Enabled |
| $V_{supercap}$ | $<$ UVLO Threshold |

Power Off
Power Source: Secondary
SOC State: Off

Secondary Battery Discharged

| LDO | Enabled |
|-----|---------|
| Boost | Disabled |
| $V_{supercap}$ | $< V_{spec}$ |

Battery Removed
Power Source: Secondary
SOC State: Low Power

| LDO | Disabled |
|-----|----------|
| Boost | Enabled |
| $V_{supercap}$ | $V_{spec}$ |

Secondary Battery Charge
Power Source: Primary

New Battery Inserted
Cold Boot

Battery Swap Ack From SOC
Led Light Indication
Battery ID Check $V_{supercap} \sim V_{spec}$ New Battery Inserted Battery Swap Ready
Power Source: Primary
SOC State: Low Power

| LDO | Disabled |
|-----|----------|
| Boost | Disabled |
| $V_{supercap}$ | $V_{spec}$ |

$V_{supercap} < V_{spec}$

Normal State
Power Source: Primary
SOC State: Active/Low Power

Battery Swap Req

| LDO | Disabled |
|-----|----------|
| Boost | Enabled |
| $V_{supercap}$ | $V_{spec}$ |

600

1400

1402

DETERMINE WHETHER TO ENTER A SWAP MODE FOR REMOVING A PRIMARY POWER SOURCE

1404

GENERATE A FIRST REGULATED VOLTAGE BASED ON A VOLTAGE FROM A SECONDARY POWER SOURCE

1406

PROVIDE THE FIRST REGULATED VOLTAGE TO A POWER OUTPUT NODE IN RESPONSE TO THE DETERMINATION

BATTERY HOT SWAPPING

TECHNICAL FIELD

Certain aspects of the present disclosure generally relate to power supply circuits and, more particularly, to techniques and apparatus for battery hot swapping.

BACKGROUND

Power management integrated circuits (power management ICs or PMICs) are used for managing the electrical power demands of a host system and may include and/or control one or more voltage regulators (e.g., buck converters or boost converters). A PMIC may be utilized in portable devices (e.g., smartphones, tablets, laptops, wearables, etc.), where power is typically provided by one or more batteries, which may be rechargeable (e.g., via a wired scheme and/or a wireless scheme). In such battery-powered portable devices, the PMIC may be used to control the flow and direction of electrical power in the devices. The PMIC may perform a variety of functions for the device such as DC-to-DC conversion (e.g., using a voltage regulator as described above), battery charging, power-source selection, voltage scaling, power sequencing, overvoltage protection, etc.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide the advantages described herein.

Certain aspects of the present disclosure provide an integrated circuit (IC) for power management. The IC generally includes a first power supply node; a second power supply node; a first port for coupling to a primary power source; a first switch coupled between the first power supply node and the first port; a second port for coupling to a secondary power source; a second switch coupled between the first power supply node and the second port; and a third switch coupled between the first power supply node and the second power supply node.

Certain aspects of the present disclosure provide a portable device comprising the IC described herein. The portable device may also include the primary power source coupled to the first port of the IC; the secondary power source coupled to the second port of the IC; and one or more circuits coupled to, and configured to receive power via, the second power supply node.

Certain aspects of the present disclosure provide an IC for power management. The IC generally includes a power supply node; a first port for coupling to a primary power source; a first switch coupled between the power supply node and the first port; a second port for coupling to a secondary power source; a first voltage regulator coupled between the power supply node and the second port; a third port for coupling to the secondary power source; a second voltage regulator comprising a first node coupled to the third port; and a second switch coupled between the power supply node and a second node of the second voltage regulator.

Certain aspects of the present disclosure provide a portable device comprising the IC described herein. The portable device may also include the primary power source coupled to the first port of the IC; the secondary power source coupled to the second port of the IC; an inductive element coupled between the third port of the IC and the secondary power source; and one or more circuits coupled to, and configured to receive power via, the power supply node.

Certain aspects of the present disclosure provide a power supply circuit for a portable device. The power supply circuit generally includes a first power supply node; a second power supply node for coupling to a primary power source; a first switch coupled between the first power supply node and the second power supply node; a third power supply node for coupling to a secondary power source; a first voltage regulator comprising an input coupled to the first power supply node and an output coupled to the third power supply node; a second voltage regulator comprising an input coupled to the third power supply node and an output coupled to the first power supply node; and an IC comprising a first port coupled to the first power supply node and a second port coupled to the third power supply node and configured to sense a parameter associated with the secondary power source, wherein the IC is configured to control charging of the secondary power source based on the sensed parameter.

Certain aspects of the present disclosure provide a method for signal generation. The method generally includes: determining whether to enter a swap mode for removing a primary power source; generating a first regulated voltage based on a voltage from a secondary power source; and providing the first regulated voltage to a power output node in response to the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 5 is a state diagram illustrating example operations behavior of a power supply circuit having voltage regulators external to a PMIC, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
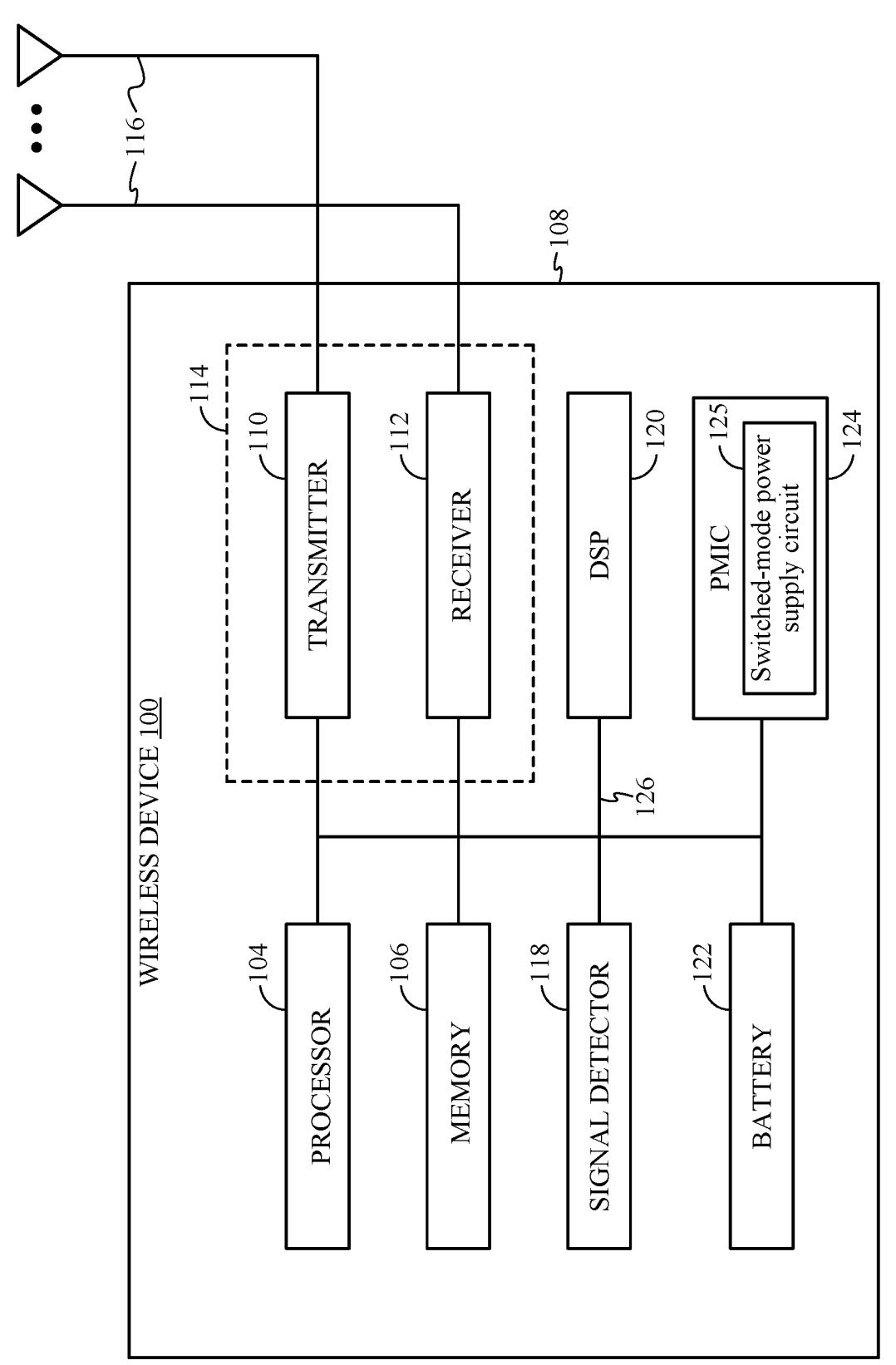
FIG. 1 is a block diagram of an example wireless device, in which aspects of the present disclosure may be practiced.

Certain aspects of the present disclosure provide techniques and apparatus for swapping (also referred to as hot swapping) a primary power source (e.g., a main battery) while using a secondary power source (e.g., a backup battery or a supercapacitor) to power an electrical device (e.g., a portable device). For example, once the primary power source is removed (e.g., for replacing or charging the battery for the electrical device), one or more regulators may be used to provide voltage for operation of the electrical device. In some aspects, the electrical device may operate in a low-power state while the primary power source is removed for charging or replacement. Some aspects provide a true hot swap technique where the electrical device can continue normal operations (e.g., without entering a low power state) while the primary power source is removed, as described in more detail herein. As used herein, true hot swapping generally refers to a swapping technique that facilitates reduced interruption of device operations during swapping as compared to other swapping techniques described herein. While some examples provided herein are described with respect to a portable device, the aspects of the present disclosure may be used for battery swapping for any suitable electrical device.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

It should be understood that aspects of the present disclosure may be used in a variety of applications. Although the present disclosure is not limited in this respect, the circuits disclosed herein may be used in any of various suitable apparatus, such as in the power supply, battery charging circuit, or power management circuit of a communication system, a video codec, audio equipment such as music players and microphones, a television, camera equipment, and test equipment such as an oscilloscope. Communication systems intended to be included within the scope of the present disclosure include, by way of example only, cellular radiotelephone communication systems, satellite communication systems, two-way radio communication systems, one-way pagers, two-way pagers, personal communication systems (PCSs), personal digital assistants (PDAs), Internet of Things (IoT) devices, and the like.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, an IoT device, a wearable device, an augmented reality device, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a transmitter 110 and/or a receiver 112 to allow transmission and/or reception, respectively, of data between the device 100 and a remote location. In some cases, the transmitter 110 and receiver 112 may be combined into a transceiver 114. One or more antennas 116 may be attached or otherwise coupled to a housing 108 of the device 100 and electrically coupled to the transceiver 114. For certain aspects, the device 100 may include multiple transmitters, multiple receivers, and/or multiple transceivers (not shown).

The device 100 may also include a signal detector 118 that may be used in an effort to detect and quantify the level of signals received by the transceiver 114 (or the receiver 112). The signal detector 118 may detect such signal parameters as total energy, energy per subcarrier per symbol, and power spectral density, among others. The device 100 may also include a digital signal processor (DSP) 120 for use in processing digital signals.

The device 100 may further include a battery 122 used to power the various components of the device 100. The battery 122 illustrated in FIG. 1 may represent multiple portable power sources, such as a main battery and a backup battery (or a supercapacitor). In some cases, the battery 122 may be rechargeable.

The device 100 may also include a power management integrated circuit (PMIC) 124 (also referred to as a "power management unit (PMU)") for managing the power from the battery 122 to the various components of the device 100, for example. In addition to managing power distribution, the PMIC 124 may perform a variety of other functions for the device, such as DC-to-DC conversion, battery charging, power-source selection, voltage scaling, power sequencing, etc. For example, the PMIC 124 may include a battery charging circuit for charging the battery 122 (or multiple portable power sources represented by the battery 122). To assist with the battery charging or for other DC-to-DC conversion purposes, the PMIC 124 may include at least a portion of a power supply circuit, which may include a voltage regulator.

A voltage regulator may provide a constant direct current (DC) output voltage based on an input voltage that may change over time. Voltage regulators may be classified as linear regulators or switching regulators. While linear regulators tend to be small and compact, many applications may benefit from the increased efficiency of a switching regulator (also referred to as a "switching converter"). A linear regulator may be implemented by a low-dropout (LDO) regulator, for example. A switching regulator may be implemented by a switched-mode power supply (SMPS), such as the SMPS circuit 125 illustrated in FIG. 1. An SMPS circuit may be implemented by any of various suitable switched-mode power supply circuit topologies, such as a buck converter, a boost converter, a buck-boost converter, or a charge pump. For example, a buck converter is a type of SMPS typically comprising: (1) a high-side switch coupled between a relatively higher voltage rail and a switching node, (2) a low-side switch coupled between the switching node and a relatively lower voltage rail. (3) and an inductive element coupled between the switching node and a load. The high-side and low-side switches may be implemented with transistors, although the low-side switch may alternatively be implemented with a diode, in some implementations.

The various components of the device 100 may be coupled together by a bus system 126. The bus system 126 may include a power bus, a control signal bus (e.g., system power management interface (SPMI) or inter-integrated circuit (I2C) bus), and/or a status signal bus in addition to a data bus.

Example Power Supply Circuit for an Electrical Device

Figure 2:
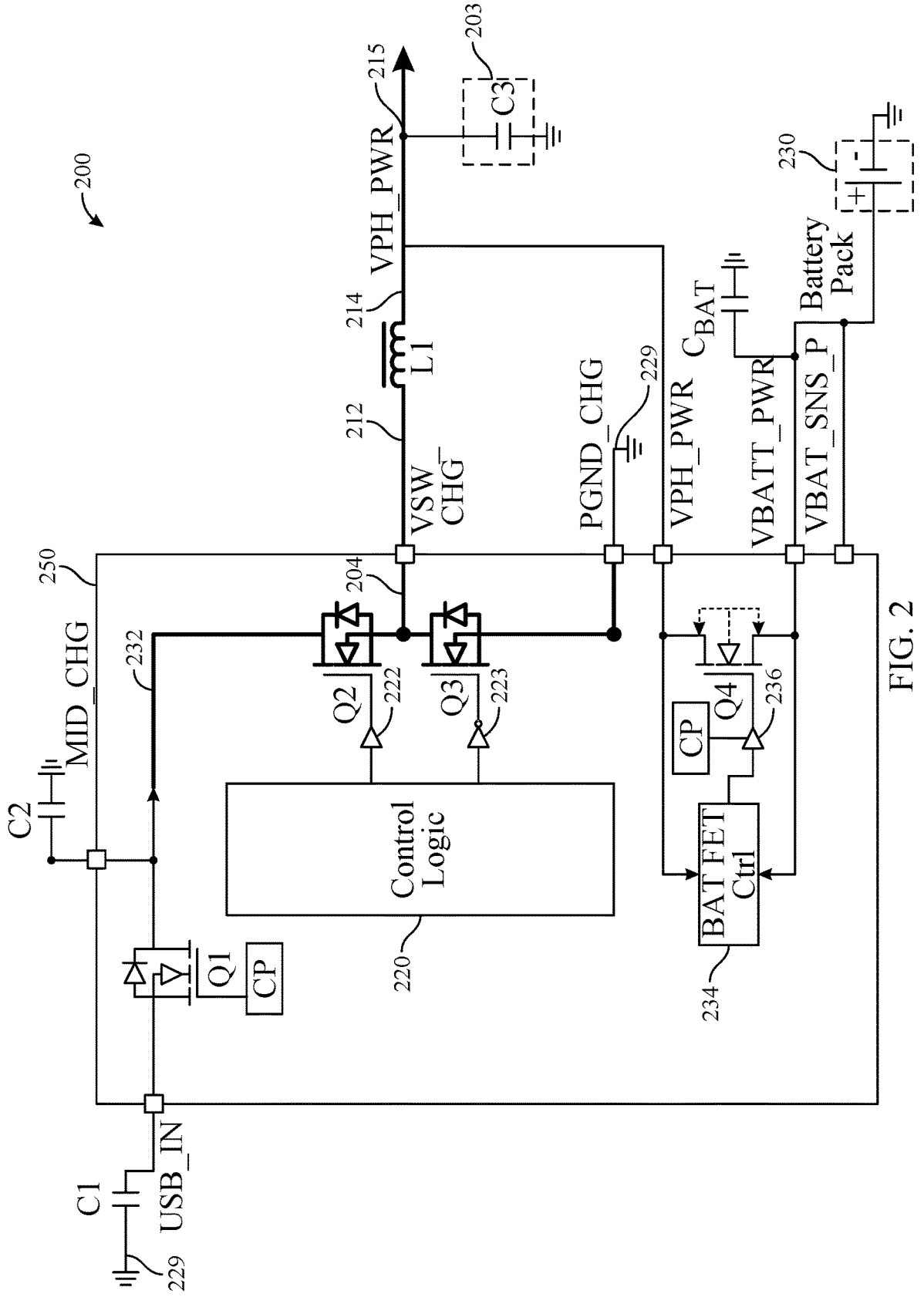
FIG. 2 is a circuit diagram of an example power supply circuit with a power management integrated circuit (PMIC), in which aspects of the present disclosure may be practiced.

FIG. 2 is a circuit diagram of an example power supply circuit 200 with battery charging capabilities, in which aspects of the present disclosure may be practiced. The power supply circuit 200 may include four transistors Q1-Q4, control logic 220, gate drivers 222, 223, an inductive element L1, battery logic 234, and a gate driver 236. Transistors Q2 and Q3 and the inductive element L1, may form a switching regulator between node 232 (labeled "MID_CHG") and node 215 (labeled "VPH_PWR"). The switching regulator may perform buck or boost operations, as described in more detail herein. A capacitive element 203 may be coupled to node 215. A load may also be coupled to node 215, such as one or more circuits of an electrical device, such as electrical device 100 of FIG. 1.

In some cases, the transistors Q1-Q4 may be implemented as n-type metal-oxide-semiconductor (NMOS) transistors or a combination of NMOS and p-channel metal-oxide semi-conductor (PMOS) transistors, as illustrated in FIG. 2. In this case, the drain of transistor Q2 may be coupled to node 232, the drain of transistor Q3 may be coupled to the source of transistor Q2 at node 204, and the source of transistor Q3 may be coupled to a reference potential node 229 (e.g., electric ground, labeled "PGND_CHG") for the circuit. The inductive element L1 may have a first terminal 212 coupled to node 204 (also referred to as the "switching node") and a second terminal 214 coupled to node 215.

The control logic 220 may control the operation of the power supply circuit 200. For example, the control logic 220 may control transistors Q2 and Q3 via output signals to the inputs of respective gate drivers 222 and 223. The outputs of the gate drivers 222 and 223 are coupled to respective gates of transistors Q2 and Q3.

During operation of the buck converter in the power supply circuit 200, the control logic 220 may have two different phases. In a first phase (referred to as a "high-side phase" or "on-state"), transistor Q2 is activated, and transistor Q3 is deactivated, to energize (e.g., charge) the inductive element L1. In a second phase (called a "low-side phase" or "off-state"), transistor Q2 is deactivated, and transistor Q3 is activated, such that the switching node (e.g., node 204) is coupled to the reference potential node (e.g., PGND_CHG) and the inductive element L1 is deenergized (e.g., discharged).

Transistor Q4 may be referred to as a battery field-effect transistor (BATFET), which may be implemented by an NMOS transistor as depicted. The drain of transistor Q4 may be coupled to node 215 (VPH_PWR), and the source of transistor Q4 may be coupled to a terminal (e.g., a positive terminal) of the battery 230 (labeled "VBATT_PWR"). The gate of transistor Q4 may be controlled by the battery logic 234 and the gate driver 236, as shown, where Q4 may be activated to charge the battery 230 or to provide electrical power from the battery to node 215 (VPH_PWR) for powering one or more circuits of the electrical device.

The power supply circuit 200 may also include a capacitive element C1, a reverse-current-blocking transistor Q1, a capacitive element C2, and a battery capacitive element CBAT. The transistor Q1 may be coupled between an input voltage node (labeled "USB_IN" for coupling to a Universal Serial Bus (USB) power source) and the drain of transistor Q2 at node 232. The capacitive element C1 may be coupled in shunt between the input voltage node USB_IN and the reference potential node 229, and the capacitive element C2 may be coupled in shunt between node 232 and the reference potential node 229. The reverse-current-blocking transistor Q1 may be implemented as an NMOS transistor, where the source of transistor Q1 is coupled to the input voltage node USB_IN and the drain of transistor Q1 is coupled to node 232. The battery capacitive element CBAT may be coupled in parallel with the battery 230 (in shunt between VBATT_PWR and the reference potential node 229).

At least a portion of the power supply circuit 200 may be implemented in an integrated circuit 250 (e.g., a PMIC or other IC for managing power). For example, as illustrated in FIG. 2, at least transistors Q1-Q4, control logic 220, gate drivers 222, 223, and 226, and battery logic 234 may be included in the integrated circuit 250. The capacitive elements C1, C2, C3, and CBAT, the inductive element L1, and the battery 230 may be implemented outside of the integrated circuit 250.

Example Power Supply Circuit for Supporting Battery Hot Swap

Battery hot swapping is a feature that may enable the swapping of a primary power source with reduced interruption as compared to conventional implementations. During a battery hot swap using the hot swapping features described herein, the electrical device 100 may have to perform a full cold boot when replacing a primary power source (e.g., battery). Instead, the electrical device 100 may operate in a low power state when the primary power source is removed, and may return to normal device operation (e.g., normal operating mode) after a charged primary power source is inserted. It is often preferable for electrical devices (e.g., internet of things (IoT) devices) to support battery hot swapping. However, conventional battery swapping features often fail to facilitate the continuous operation of an electrical device 100, as is desired in many applications. As such, there is a continual need for improved battery hot swapping for portable devices.

Accordingly, aspects of the present disclosure provide techniques and apparatus for detecting a battery swap condition and providing electrical power from a secondary power supply while maintaining expected electrical device operation. For example, aspects of the present disclosure may allow for an electrical device in a remote location (e.g., without access to charging for the primary power supply) to change to a secondary power supply without losing data extraction/operational activity. As a result, the electrical device may be able to continue electrical device operation with little to no interruption. In another example, aspects of the present disclosure may allow for an electrical device performing continuous video recording to perform a swap of the primary power supply without interruption to a video recording operation. In yet another example, aspects of the present disclosure may allow for an electrical device used for inventory management to continue normal operation without a device cold boot or device charging time. In yet another example, aspects of the present disclosure may allow for an electrical device used as a shopping cart (e.g., for payment at checkout) to perform a battery swap of the primary power supply without losing products already added to the cart.

Figure 3:
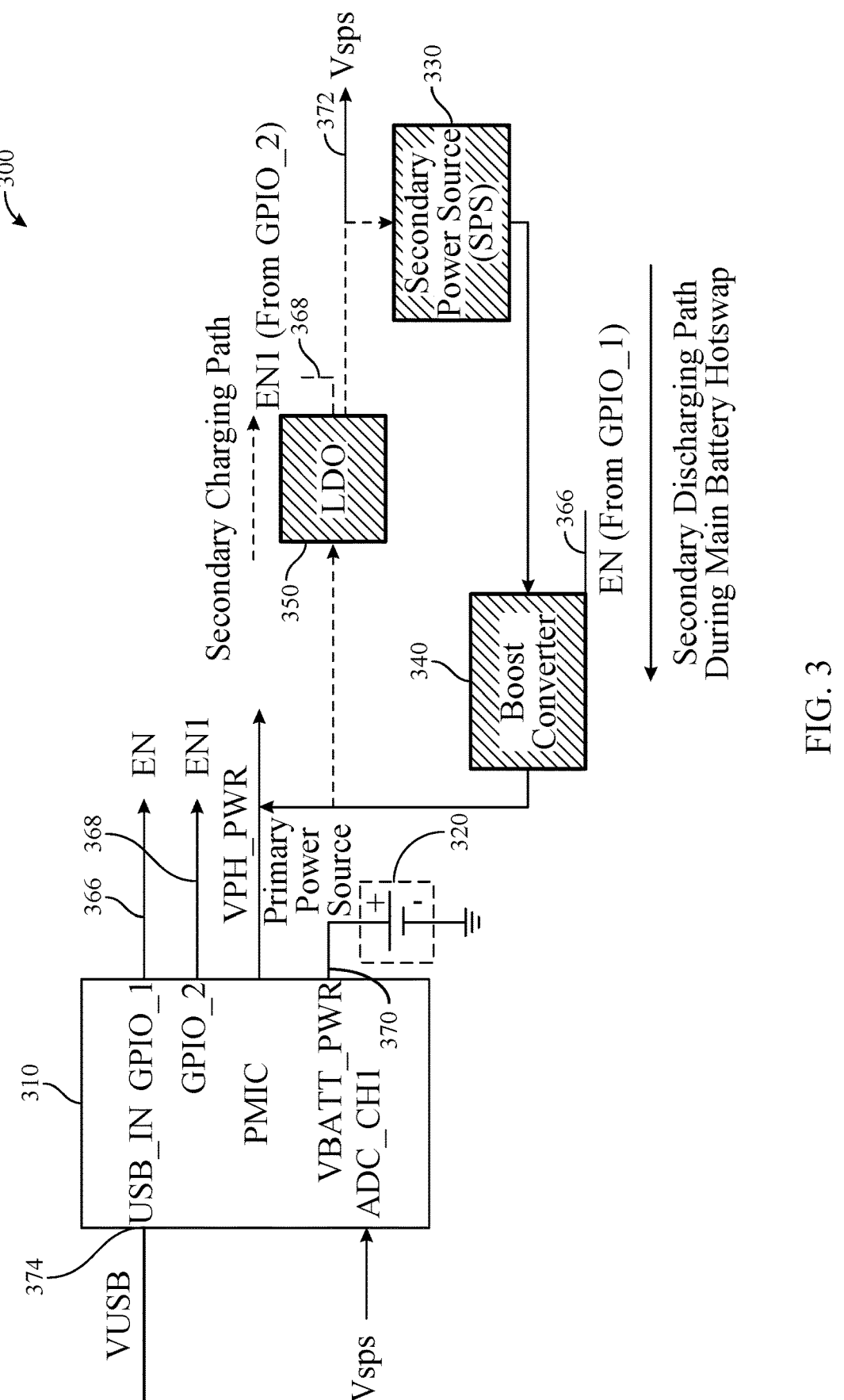
FIG. 3 is a block diagram of an example power supply circuit having voltage regulators external to a PMIC, in accordance with certain aspects of the present disclosure.

FIG. 3 is a block diagram of an example power supply circuit 300 with a PMIC 310 and external voltage regulators (e.g., boost converter 340, LDO regulator 350) for charging and providing power from a secondary power supply (SPS) 330, in accordance with certain aspects of the present disclosure. The power supply circuit 300 may include a PMIC 310, a primary power source (PPS) 320 coupled to node 370, the SPS 330, the boost converter 340, and the LDO regulator 350. According to certain aspects, the SPS 330 may be implemented as a supercapacitor, and the PPS 320 may be implemented as a battery.

For certain aspects, the PMIC 310 may be coupled to an input voltage node (labeled "VUSB" or "USB_IN") at port 374 and an SPS voltage node 372 (labeled "Vsps"). The PMIC 310 may also include an analog-to-digital converter (ADC) configured to sense a voltage of the SPS 330 (e.g., via port 364 coupled to the SPS voltage node 372). For example, the SPS voltage node 372 (Vsps) may be coupled to the ADC. The PMIC 310 may be coupled to an enable input (EN) node 366 via a general-purpose input/output port (labeled "GPIO_1"), an enable input (EN1) node 368 via a second GPIO port (labeled "GPIO_2"), and a PPS voltage node (labeled "VBATT_PWR"). The PMIC 310 may further be coupled to an output node (labeled "VPH_PWR"), which may provide power for one or more circuits of the electrical device 100. Node 366 (EN) may be coupled to an input of the boost converter 340 to enable/disable the boost converter 340, and node 368 (EN1) may be coupled to an input of the LDO regulator 350 to enable/disable the LDO regulator 350. The PPS voltage node (VBATT_PWR) may couple the PMIC 310 to the PPS 320. The operations of the power supply circuit 300 are described in more detail herein with respect to FIG. 4A, FIG. 4B, and FIG. 4C.

Figure 4A:
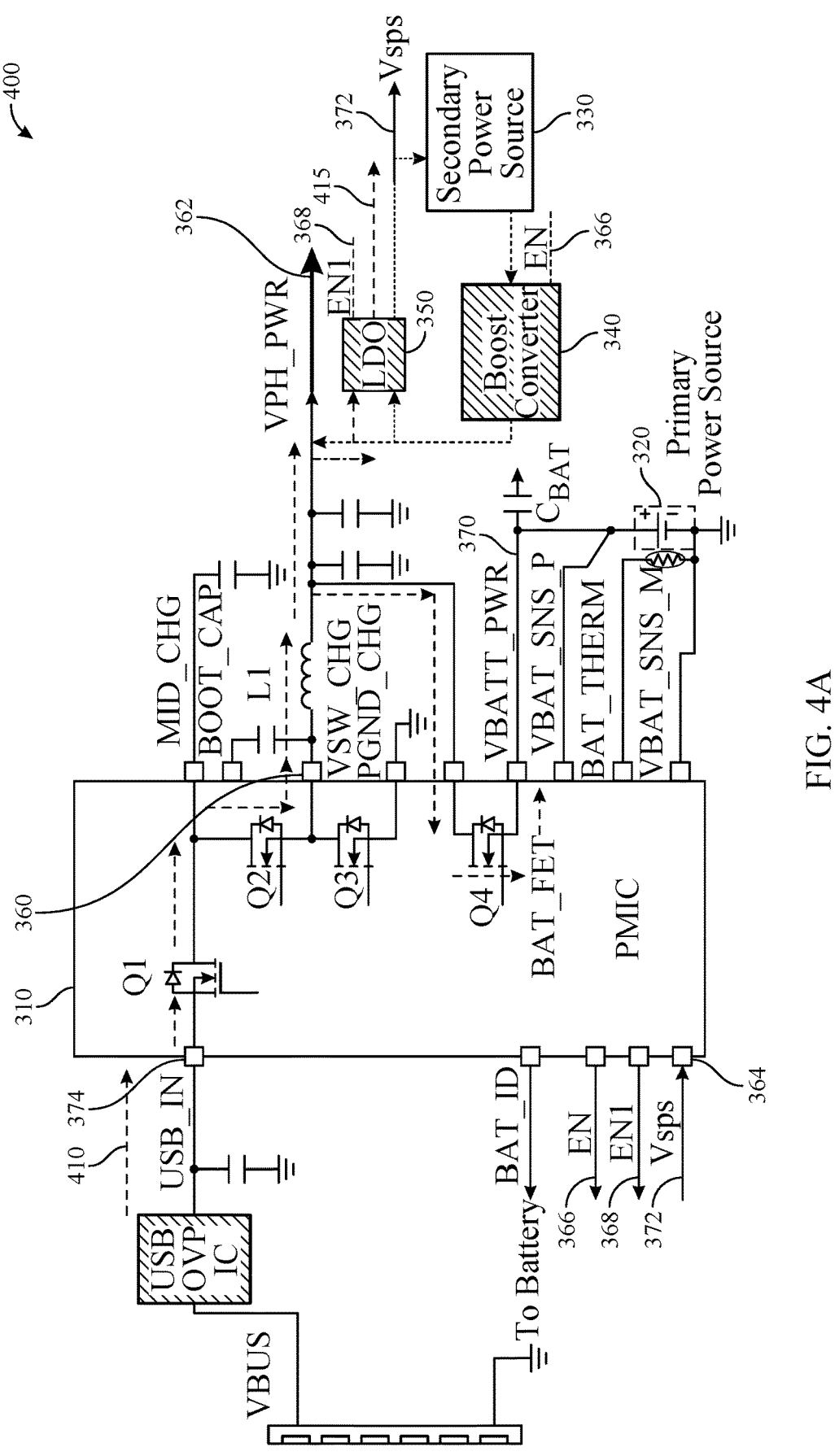
FIG. 4A, FIG. 4B, and FIG. 4C illustrate example current paths for a power supply circuit, in accordance with certain aspects of the present disclosure.

FIG. 4A is a circuit diagram of an example power supply circuit 400 showing an example current path 410 for charging the PPS 320 and an example current path 415 for charging SPS 330, in accordance with certain aspects of the present disclosure. The power supply circuit 400 may be similar to the power supply circuit 300, and may include the PMIC 310, the PPS 320, the SPS 330, the boost converter 340, and the LDO regulator 350. The PMIC 310 of the power supply circuit 400 may be coupled to the input voltage node (USB_IN) via a port 374 of the PMIC 310. The PMIC 310 may also be coupled to node 366 (EN), node 368 (EN1), and the voltage PPS node 370 (VBATT_PWR). The PMIC 310 may be coupled to the SPS voltage node 372 (Vsps) via a port 364 of the PMIC 310, and the output node 362 (VPH_PWR) via a port 360 of the PMIC 310. In the example of FIG. 4A, transistors Q2 and Q3 and the inductive element L1 and load capacitive element may form a buck converter (e.g., in a forward direction by generating a buck voltage at output node 362 based on voltage at node 370). As described herein, transistors Q2, Q3 and inductive element L1 may also form a boost converter when operated in the reverse direction (e.g., generating a boosted voltage at port 374 based on voltage at output node 362).

According to certain aspects, the power supply circuit 400 may be connected to and receive electrical power from the input voltage node (USB_IN) via port 374. The received power may flow from port 374 to the PPS node 370 (VBATT_PWR) and PPS 320 (as illustrated by current path 410), as well as to SPS voltage node 372 (Vsps) and the SPS 330 (e.g., using current path 415). For example, the electrical power may be provided from port 374 through transistor Q1. Transistors Q2, Q3 and inductive element L1 perform buck operations to generate a regulated voltage at the output node 362. The electrical power from output node 362 may be provided to the LDO regulator 350. The LDO regulator provides a current controlled voltage regulation that is provided to the SPS voltage node 372 (Vsps) and the SPS 330 (e.g., to charge SPS 330). In this example, the electrical power may also be provided from output node 362 to the PPS voltage node 370 (VBATT_PWR) and PPS 320 (e.g., to charge PPS 320). Here, transistor Q4 (e.g., switch) is activated (e.g., closed) to allow the electrical power to be provided from the input voltage node (USB_IN) to the PPS 320. In certain aspects, the electrical power may also be provided from port 360 to the output node 362 (VPH_PWR) to provide power for one or more circuits of the electrical device 100.

Figure 4B:
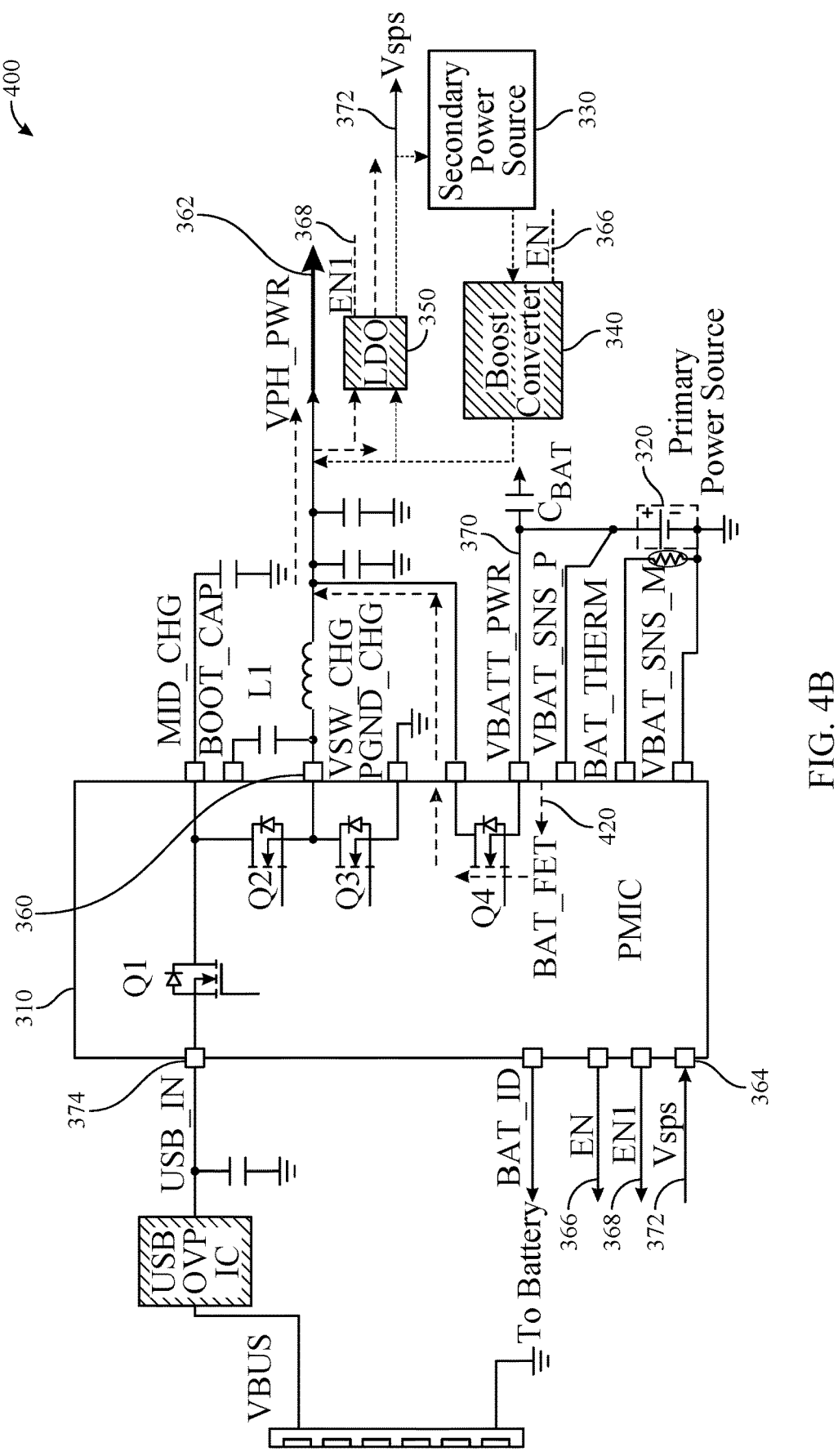

FIG. 4B illustrates an example current path for a PPS operation and an SPS charging phase (also referred to as a charging mode) in the example power supply circuit 400 of FIG. 4A, in accordance with certain aspects of the present disclosure. According to certain aspects, the power supply circuit 400 may operate (e.g., provide electrical power to the electrical device 100 of FIG. 1) using electrical power from the PPS 320 until a safe discharge configurable threshold is reached (e.g., 70% of state of charge (SoC)), when electrical power from the input voltage node (USB_IN) is not available. If PPS 320 reaches a safe discharge threshold, LDO regulator 350 may be disabled. For the PPS phase using current path 420, the PPS 320 may supply electrical power to the output node 362 (VPH_PWR). For the SPS charging phase, the electrical power may also be provided to LDO regulator 350 for generating a regulated voltage at the SPS voltage node 372 (Vsps) for charging SPS 330. In some aspects, the regulated voltage at the SPS voltage node 372 may also be used as a backup supply voltage.

During PPS phase, the electrical power may be provided from PPS 320 through transistor Q4 to the output node 362 (VPH_PWR). During SPS charging phase, the electrical power may be further provided to the LDO regulator 350. The LDO regulator 350 may generate a regulated voltage to charge SPS 330, as described. As described, transistor Q4 (e.g., switch) is activated (e.g., closed) to allow the routing of the electrical power from the PPS 320 to the output node 362 (VPH_PWR). The regulated voltage generated by the LDO regulator 350 may be provided to the SPS voltage node 372 (Vsps) and the SPS 330, to charge the SPS 330.

Figure 4C:
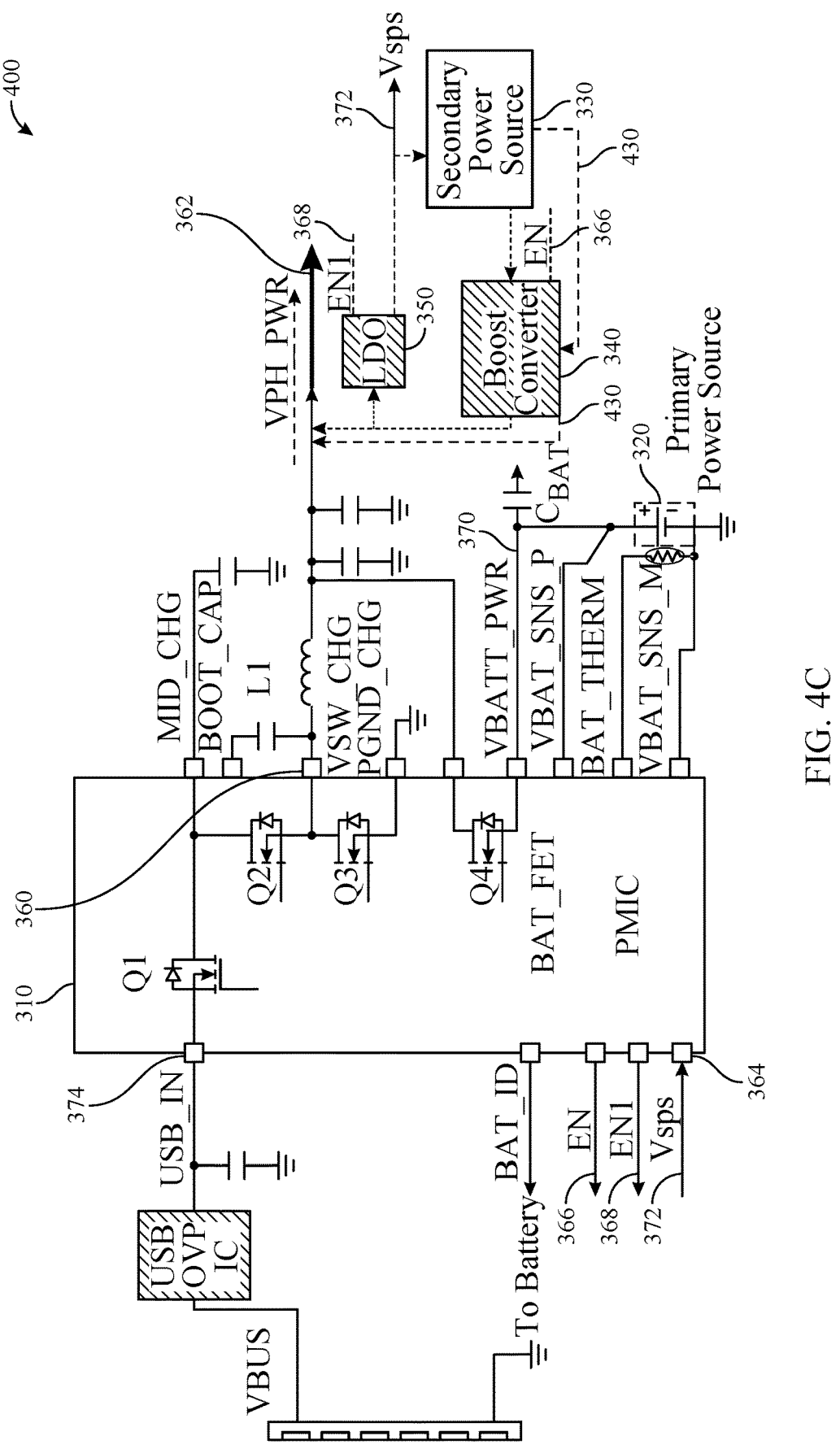

FIG. 4C illustrates an example current path 430 associated with an SPS phase of the example power supply circuit 400, in accordance with certain aspects of the present disclosure. According to certain aspects, the power supply circuit 400 may be operating using electrical power from the PPS 320 (as described above with respect to FIG. 4B), and may swap the PPS 320 while using the SPS 330 to provide electrical power to the electrical device 100 of FIG. 1. In this case, the SPS 330 may supply electrical power to the output node 362 (VPH_PWR) (using current path 430) to power the electrical device 100. For example, electrical power may be provided from the SPS 330 to the boost converter 340. The boost converter 340 may generate a regulated boosted voltage that is provided to the output node 362 (VPH_PWR). Here, transistor Q4 (e.g., switch) is deactivated (e.g., open), so that the PPS 320 can be decoupled from the output node 362 and replaced.

FIG. 5 is a state diagram illustrating example operations 500 of a power supply circuit, such as the power supply circuit 300 of FIG. 3 or power supply circuit 400 of FIG. 4A, FIG. 4B, and FIG. 4C, in accordance with certain aspects of the present disclosure. The operations 500 may be facilitated, for example, by the PMIC 310.

The operations 500 may optionally begin at state 504, where the power supply circuit may operate in a normal state (e.g., normal operating mode corresponding to the PPS operation described with respect to FIG. 4B). In the normal state, the PPS 320 may provide electrical power to the electrical device 100, and the electrical device 100 may operate in either an active (e.g., normal) power mode or a low power mode. The LDO regulator 350 and the boost converter 340 are both disabled in the normal state (e.g., by controlling enable nodes 366, 368), and the voltage at the SPS voltage node (Vsps or the voltage of SPS 330, also referred to as Vsupercap assuming a supercapacitor is used as the SPS) may be equal to a SPS specification voltage (e.g., Vspec). When the voltage at the SPS voltage node (Vsps) is less than Vspec and the main battery voltage is above a safe discharge configuration threshold (e.g., state of charge is above 70%) the PMIC 310 may enable the LDO regulator 350 using node 368 (EN1), and the operations 500 proceed to state 502 (e.g., corresponding to SPS charging phase described with respect to FIG. 4B).

At state 502, the PPS 320 provides electrical power to the SPS 330, as described with respect to FIG. 4B. In addition, the LDO regulator 350 is enabled, and the boost converter 340 is disabled in the SPS charging state 502. As described, the LDO regulator 350 generates a regulated voltage to charge the SPS 330. The PMIC 310 may sense when the voltage at the SPS voltage node (Vsps) 372 becomes substantially equal to Vspec, and disables the LDO regulator 350 using node 368 (EN1) to stop the charging of the SPS 330. When charging of the SPS 330 stops, the operations 500 proceed to state 504, as described above.

Once the PMIC determines that the PPS is to be swapped (e.g., based on user input), the operations 500 proceed to state 506. At state 506, the PPS 320 may continue to provide electrical power to the electrical device 100, and the electrical device 100 may operate in low power mode (e.g., to conserve the remaining electrical power in the PPS 320). In addition, the PMIC 310 may enable the boost converter 340 using node 366 (EN) to generate a boosted voltage at the output node 362 (VPH_PWR) using power from the SPS 330, as described above with respect to FIG. 4C. In some aspects, a battery swap acknowledgement may be provided by the system on chip (SoC) (e.g., electrical device 100) using an indication device (e.g., a light-emitting diode (LED)). The operations 500 may transition from state 506 to state 508. In addition, the electrical device 100 may provide at least one indication of the battery swap. The indication may be visual (e.g., an LED, which may be constant or blinking during hot swap mode) and/or aural (e.g., a speaker tone, periodic beep, or vibration). In some aspects, the PMIC may include a BATT ID or BATT THERM port coupled to the PPS 320. The BATT ID/BATT THERM port may provide an indication of whether the PPS 320 is removed (e.g., the BATT ID/BATT THERM port may be floating when the PPS 320 is removed). The PPS 320 may be removed during the transition from state 506 to state 508. The PMIC may determine that the PPS 320 is removed via the BATT ID/BATT THERM port.

At state 508, after the PPS 320 (e.g., battery) has been removed, the SPS 330 may provide electrical power to the electrical device 100 (e.g., during a swap mode), as described above with respect to FIG. 4C. In this state, the electrical device 100 may operate in low power mode. In addition, the boost converter 340 remains enabled and the LDO regulator 350 remains disabled during state 508. When a new or charged PPS 320 is inserted, the operations 500 may transition from state 508 to state 504

If at state 508, the SPS 330 is discharged to voltage equal to or less than a threshold (e.g., an under voltage lockout (UVLO) threshold), then the operations 500 may transition from state 508 to state 510. At state 510, circuitry of the power supply circuit may be powered off, and the electrical device 100 may be powered off. For example, the LDO regulator 350 may be disabled during state 510. In some aspects, the boost converter 340 may remain enabled during state 510 until system graceful shutdown. If a new PPS 320 (e.g., a new battery) is inserted, the power supply circuit may perform a cold boot, and the operations 500 may proceed to state 504.

According to certain aspects, the PMIC 310 may include various integrated components for performing the techniques described herein. For instance, the PMIC 310 may include switches for generating a power supply voltage and charging power sources, as described in more detail with respect to FIG. 6, FIG. 7A, FIG. 7B, and FIG. 7C.

Figure 6:
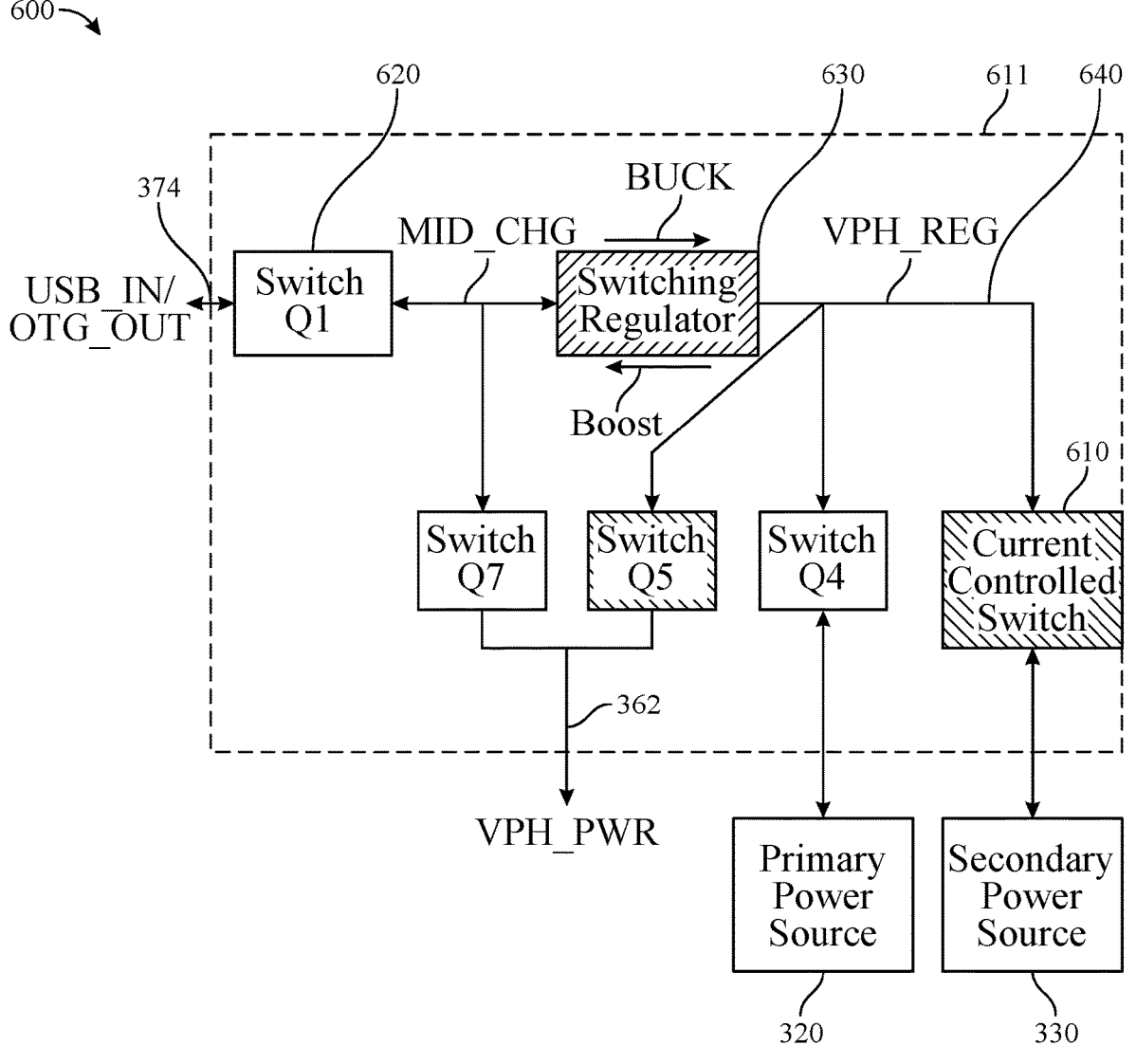
FIG. 6 is a block diagram of an example power supply circuit having circuitry for voltage regulation internal to a PMIC, in accordance with certain aspects of the present disclosure.

FIG. 6 is a block diagram of an example power supply circuit 600 with a PMIC 611 including switches for charging a primary and/or a secondary power source (e.g., PPS 320, SPS 330), in accordance with certain aspects of the present disclosure. Secondary power source shall be battery or a supercapacitor The power supply circuit 600 may include the PMIC 611, the PPS 320, the SPS 330, a current control switch 610 (e.g., a transistor for controlling charging current to SPS 330), a switching regulator 630, and transistor 620 (Q1). In certain aspects, the current control switch 610 may be implemented by a transistor (e.g., transistor Q6, as illustrated in FIG. 7A, FIG. 7B, and FIG. 7C).

According to certain aspects, the SPS 330 may provide electrical power to the output node 362 (VPH_PWR). For example, the SPS 330 may provide electrical power to the output node 362 (VPH_PWR) through transistor Q5 (e.g., switch Q5) when the voltage at the output node 362 (VPH_PWR) is less than the voltage of the SPS 330. In this case, transistor Q5 is activated (e.g., closed) to allow for providing of electrical power, transistor Q7 may be open, and the switching regulator 630 may be disabled.

According to certain aspects, the PMIC 611 may be coupled to an input voltage node (labeled "USB_IN"). The transistor 620 may be coupled to the switching regulator 630 and transistor Q7 via the node 232 (labeled MID_CHG). The switching regulator 630 may be coupled to transistor Q7, transistor Q4, and the current control switch 610 through a node 640 (labeled "VPH_REG"). Transistors Q5 and Q7 may be coupled to the output node 362 (VPH_PWR), as shown.

Figure 7A:
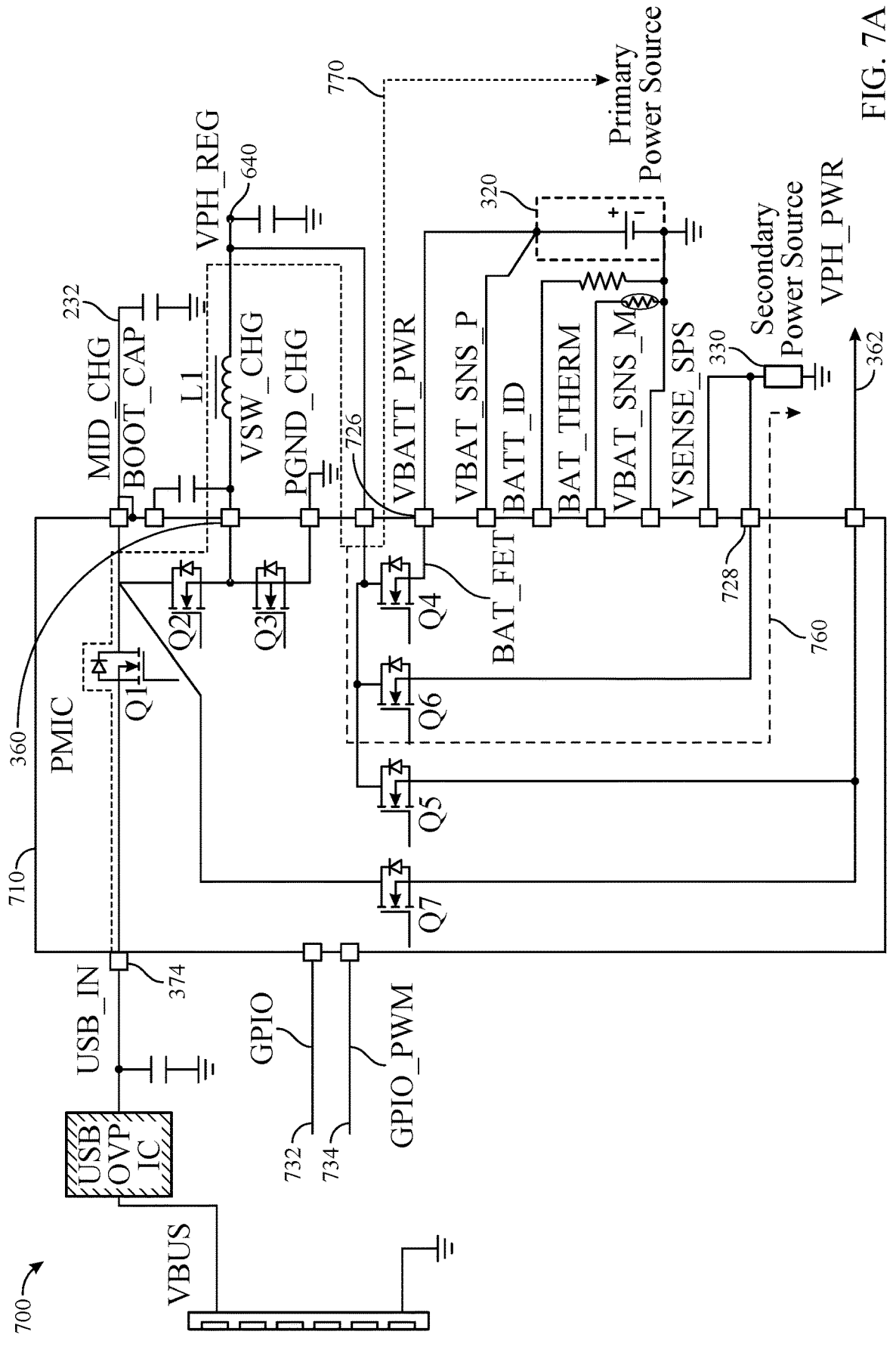
FIG. 7A, FIG. 7B, and FIG. 7C illustrate example current paths for a power supply circuit having circuitry for voltage regulation internal to a PMIC, in accordance with certain aspects of the present disclosure.
Figure 7B:
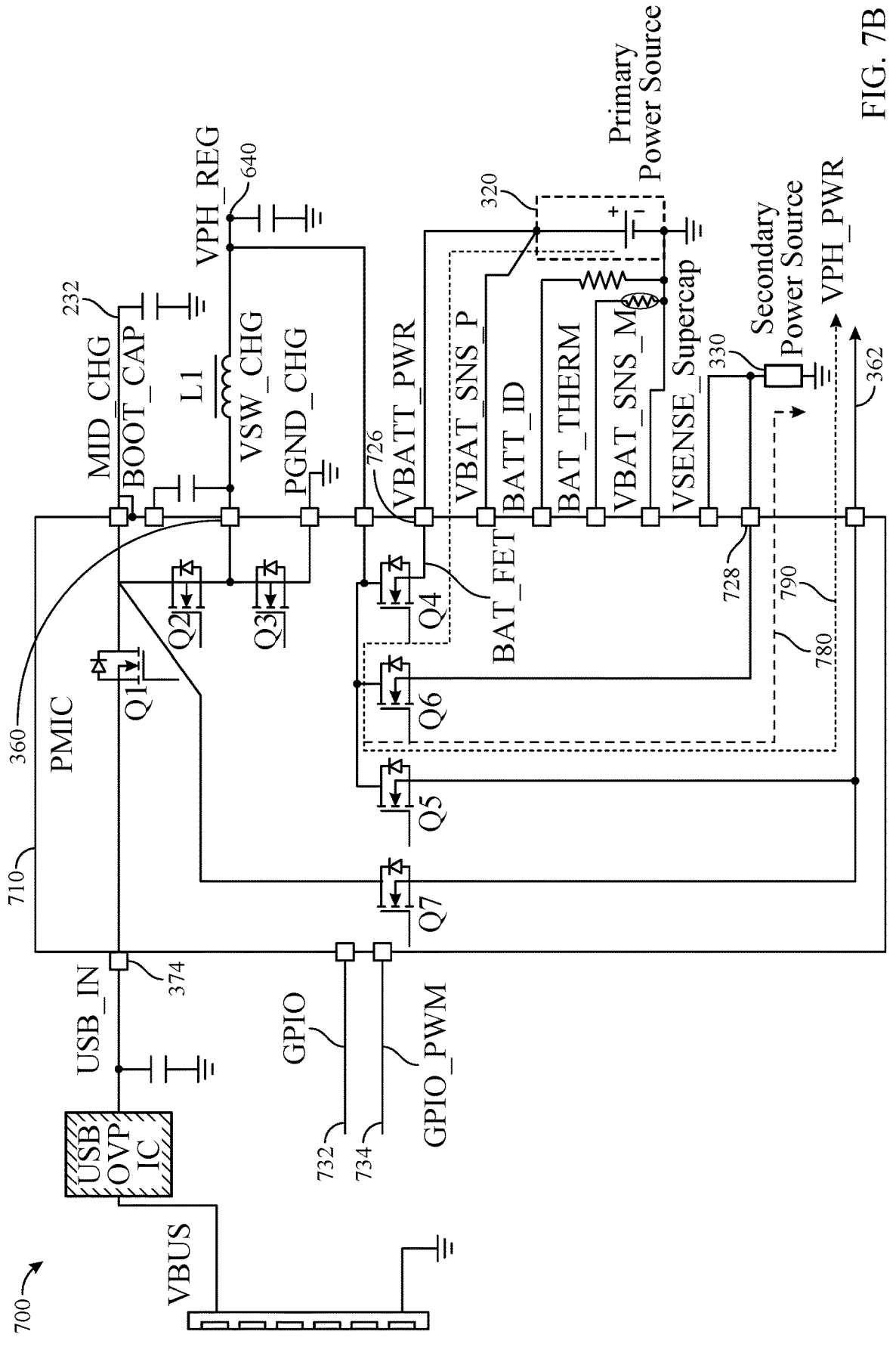
Figure 7C:
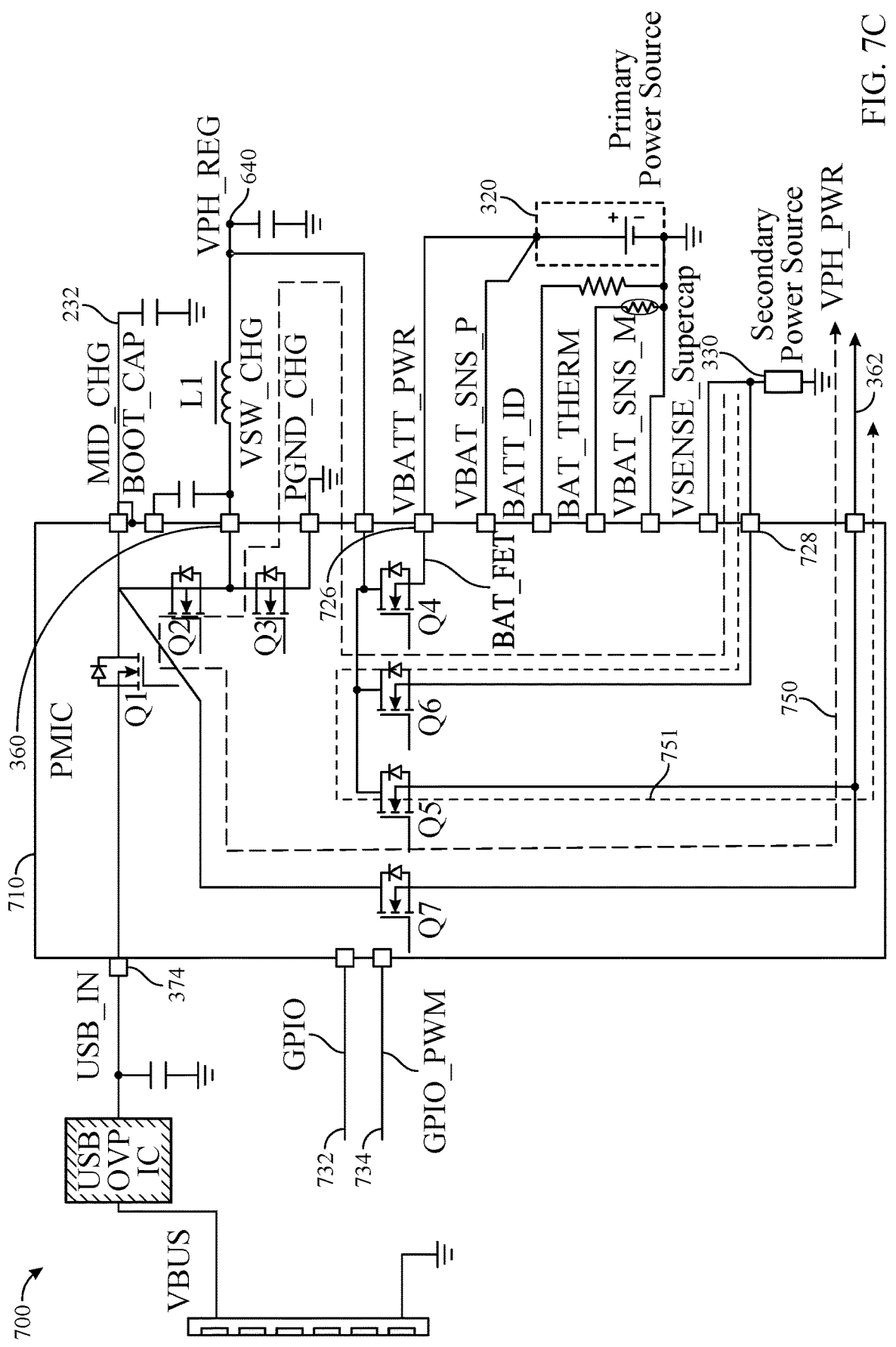

FIG. 7A is a circuit diagram of an example power supply circuit 700 showing an example current path 770 for charging the PPS 320 and an example current path 760 for charging the SPS 330, in accordance with certain aspects of the present disclosure. The power supply circuit 700 may be similar to the power supply circuit 600, and may include a PMIC 710 (e.g., corresponding to PMIC 611 of FIG. 6), the PPS 320, and the SPS 330. The power supply circuit 600 includes a transistor Q6 (e.g., corresponding to the current control switch 610) and a transistor Q1 (e.g., corresponding to the transistor 620 of FIG. 6). In certain aspects, the PMIC may include transistors Q2 and Q3 and inductive element L1 for implementing a switching regulator (e.g., corresponding to switching regulator 630) coupled to a regulated voltage node 640 (VPH_REG). In the example of FIG. 7A, the switching regulator may form a buck converter coupled between node 232 (labeled MID_CHG) and node 640

(VPH_REG). According to certain aspects, the PMIC 710 may be coupled to a GPIO port 732 (labeled "GPIO") and a GPIO port 734 (labeled "GPIO_PWM"), and may also be coupled to the PPS 320 via a port 726 of the PMIC 710. The PMIC 710 may also be coupled to the SPS 330 via a port 728 of the PMIC 710.

For certain aspects, the power supply circuit 700 may be connected to and receive electrical power from the input voltage node (USB_IN) via the port 374. The received power from the port 374 may be used to charge the PPS 320 (as illustrated by current path 770), as well as to charge the SPS 330 (as illustrated by current path 760). The PPS 320 and the SPS 330 may be charged to a power threshold via the power from the input voltage node at port 374. For example, the electrical power may be provided from port 374 through transistor Q1 to transistor Q2. Transistors Q2, Q3 and inductive element L1 may perform buck operations to generate a regulated voltage at node 640. The electrical power may be provided from node 640 through transistor Q6 to the SPS 330 via port 728 (e.g., to charge SPS 330). In this example, electrical power may also be provided from node 640 through transistor Q4 to the PPS 320 (e.g., to charge PPS 320). Here, transistor Q4 and transistor Q6 may be activated (e.g., closed) to allow the routing of the electrical power from the input voltage node (USB_IN) to both the PPS 320 and SPS 330. According to certain aspects, the electrical power may also be routed from node 640 through transistor Q5 to output node 362 (VPH_PWR) to provide power for one or more circuits of the electrical device 100.

FIG. 7B illustrates example current paths for PPS operation (e.g., using current path 790) and SPS charging operation (e.g., using current path 780), in accordance with certain aspects of the present disclosure. For certain aspects, the power supply circuit 700 may operate using electrical power from the PPS 320 when electrical power from the input voltage node (USB_IN) via port 374 is unavailable. In this case, the PPS 320 may supply electrical power to both the output node 362 (VPH_PWR) (using current path 790) and to the SPS 330 via port 728 (using current path 780), in order to both power the electrical device 100 and charge the SPS 330 as long as charge of PPS is above a safe discharge configurable threshold (e.g., 70% state of charge). If PPS 320 is discharged below the safe discharge configurable threshold, SPS 330 charging may be disabled by turning off transistor Q6. For example, the electrical power may be provided from PPS 320 through transistor Q4 and transistor Q5 to the output node 362 (VPH_PWR). Here, transistors Q4 and Q5 (e.g., switches) are activated (e.g., closed) to allow the routing of the electrical power to SPS 330. The electrical power may further be routed from the PPS 320 through transistor Q4 and transistor Q6 to the SPS 330 (e.g., to charge SPS 330). Here, transistors Q4 and Q6 (e.g., switches) are activated (e.g., closed) to allow the routing of the electrical power. Transistor Q6 may be a current controlled linear charger that may be used to control the current provided for charging the SPS 330. If SPS 330 is a supercapacitor, based on ADC sense voltage measurement, charging may be terminated to a safe operating voltage (e.g., 2.8 volts). In case a low capacity battery is used to implement SPS 330, the charging may be terminated after the battery has reached a rated termination voltage.

FIG. 7C illustrates an example current path 750 for SPS operation during battery swap mode, in accordance with certain aspects of the present disclosure. In the example of FIG. 7C, transistors Q2 and Q3 and the inductive element L1, may form a boost converter topology to generate a boosted voltage based on the power from SPS 330. For example, transistors Q2 and Q3 may perform boost operations to generate the boosted voltage.

As described, the PPS 320 may be swapped, while using the SPS 330 to provide electrical power to the electrical device 100. For example, the SPS 330 may supply electrical power to the output node 362 (VPH_PWR) to power the electrical device 100.

For certain aspect, where a battery is used to implement the SPS, the electrical power may be provided (e.g., via current path 751) from SPS 330 through transistor Q6 and transistor Q5 to node 362. Here, transistors Q2, Q3, Q4 and Q7 may be deactivated.

For certain aspects, where a supercapacitor is used to implement the SPS 330, the electrical power may be provided from SPS 330 through transistor Q6 and inductive element L1. Transistors Q2 and Q3 may be controlled to generate the boosted voltage at the output node 362 (VPH_PWR) with transistor Q7 activated (e.g., as shown via current path 750). Here, transistor Q4 (e.g., switch) may be deactivated, such that the PPS 320 is decoupled from the PMIC 710 and replaced. In addition, transistors Q5 and transistor 620 (Q1) may be deactivated (e.g., open). The boosted voltage at VPH_PWR may be the same or slightly above a minimum system operating voltage (e.g., 3.2 volts).

Figure 8:
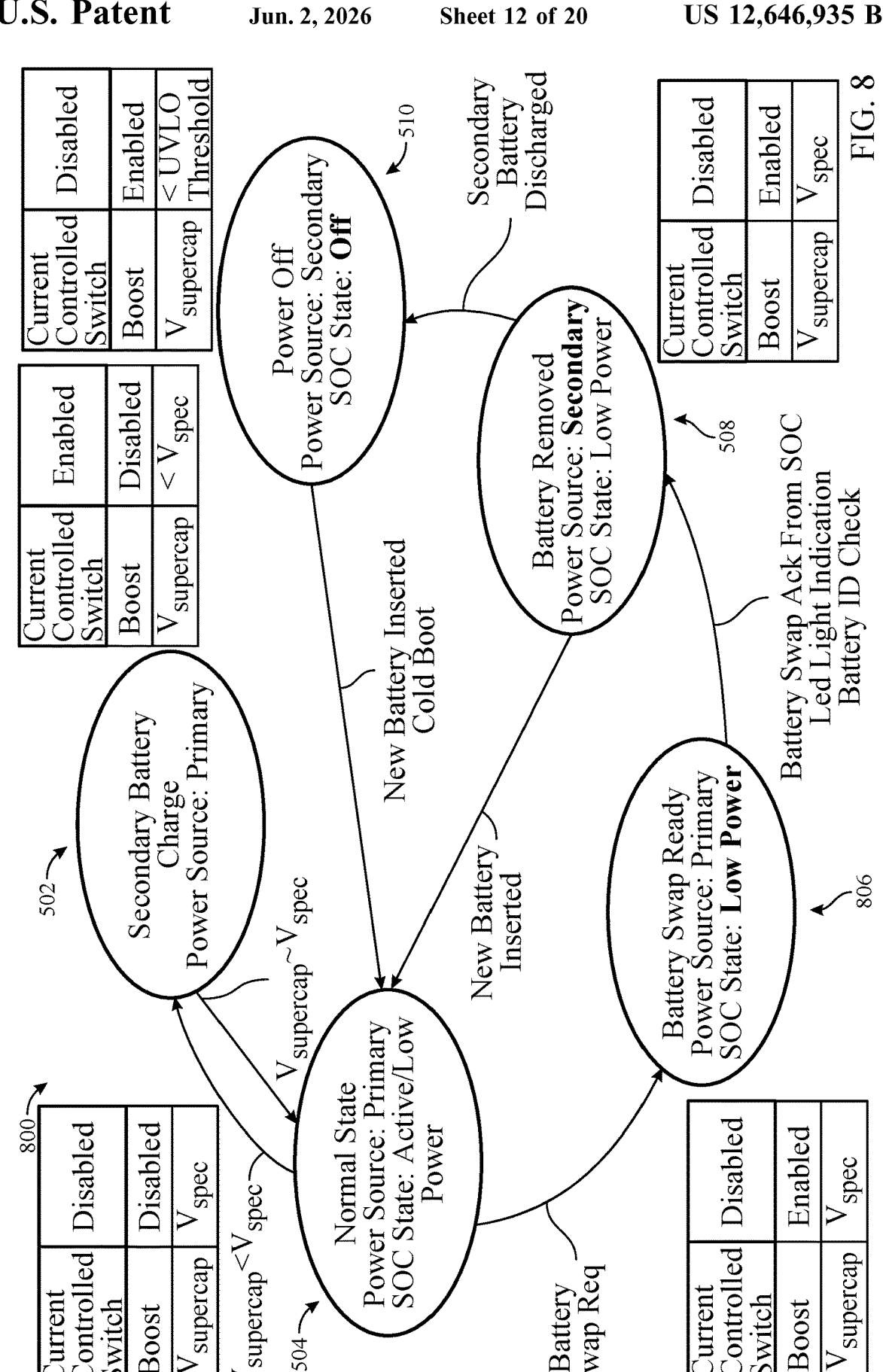
FIG. 8 is a state diagram illustrating operations of a power supply circuits having circuitry for voltage regulation internal to a PMIC, in accordance with certain aspects of the present disclosure.

FIG. 8 is a state diagram illustrating the operations 800 of a power supply circuit (e.g., power supply circuit 600 of FIG. 6 or power supply circuit 700 of FIGS. 7A-7C), in accordance with certain aspects of the present disclosure. The operations 800 may be facilitated, for example, by a PMIC (e.g., the PMIC 611 or the PMIC 710). The operations 800 may be similar to the operations 500 described with respect to FIG. 5.

The operations 800 may optionally begin at state 504, where the power supply circuit may operate in a normal state, as described herein. In some aspects, if the voltage (e.g., V supercap) of the SPS 330 is less than Vspec, the operations 800 proceeds to state 502 and the PMIC closes the current control switch 610 (e.g., activate or enable transistor Q6) to charge the SPS 330, as described herein.

When the electrical power of the PPS 320 reaches a certain threshold, a battery swap may be performed. For example, the operations 800 may proceed to state 806. According to certain aspects, port 732 (GPIO) described with respect to FIG. 7A may receive a control signal for enabling hot swap mode. The control for enabling hot swap mode may be active high or active low based on user configuration. At state 806, the PPS 320 provides electrical power to the electrical device 100, and the electrical device 100 may operate in low power mode. In state 806, the switching regulator 630 described with respect to FIG. 6 (e.g., associated with the boost operations performed by transistors Q2, Q3) may remain disabled. The operations may transition from state 806 to state 508. The electrical device 100 may provide at least one indication of the battery swap via any suitable indication device. The indication may be visual (e.g., an LED, which may be constant or blinking during hot swap mode) and/or aural (e.g., a speaker tone, periodic beep or vibration). GPIO port 734 (GPIO_PWM) described with respect to FIG. 7A may be coupled to the indication device for indicating the hot swap mode is enabled.

In state 508, the PMIC may enable the switching regulator 630 (enable boost operations via transistors Q2 and Q3). Via the switching regulator (or boost operations via transistors Q2 and Q3), the voltage of the SPS 330 may be boosted to generate a voltage at the output node 362 for operating the electrical device 100. Transistor Q7 may be active (e.g., closed). If the SPS 330 is discharged (e.g., the voltage at the SPS node (Vsps) is less than a threshold (e.g., UVLO)), then the operations 800 may transition from state 508 to state 510 where the PMIC and electrical device are turned off.

Figure 9A:
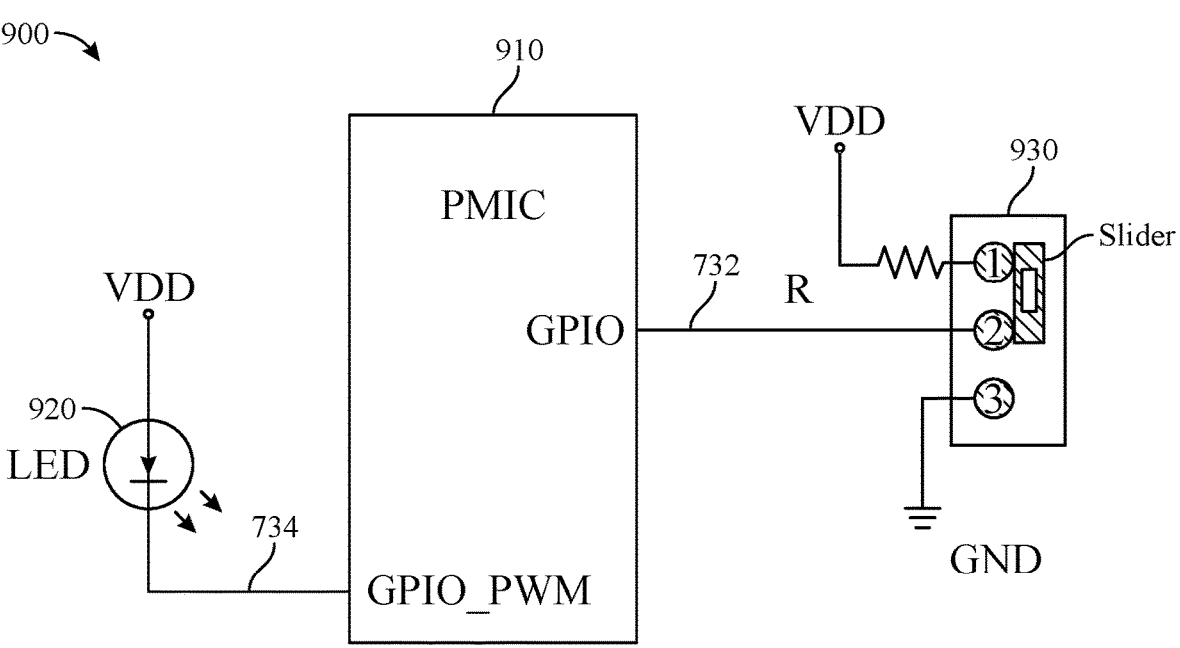
FIG. 9A is a block diagram of a hardware interface for controlling battery hot swapping, in accordance with certain aspects of the present disclosure.

FIG. 9A is a block diagram of example power supply circuit 900 (e.g., corresponding to power supply circuit 300, 400, 600, or 700), with a hardware interface for controlling battery swapping and an example indicator device (e.g., LED 920), in accordance with certain aspects of the present disclosure. The indicator device may be configured to provide an indication of the hot swap mode (e.g., whether hot swap mode is enabled). The indicator may be visual (e.g., an LED, which may be constant or blinking during hot swap mode), a display (e.g., display 940 in FIG. 9B), and/or aural (e.g., a speaker tone or periodic beep) or haptics vibration. Entering and exiting hot swap mode may be controlled by user action via hardware. For example, the PMIC 910 (e.g., corresponding to PMIC 310, 611, 710) may include the port 734 (GPIO_PMW), and the port 732 (GPIO).

According to certain aspects, port 734 (GPIO_PMW) may be coupled to a LED 920, and port 732 (GPIO) may be coupled to an interface 930. The interface 930 may be associated with the electrical device 100, and may be used to selectively control the electrical device 100 to enter the hot swap mode. The interface 930 may include a slider switch (labeled "slider"), a toggle switch, or a push button switch. For example, a user may manipulate the slider (e.g., sliding switch) of the interface 930 from a first position illustrated in FIG. 9A (coupling together nodes 1 and 2), to a second position (coupling together nodes 2 and 3), in order to trigger the battery hot swapping. Either the first position or the second position of the slider may be configured as the trigger for the power supply circuit to enter hot swapping mode, depending on user preference. While FIG. 9A provides an example technique for entering battery swap mode, any suitable technique may be used. For example, port 732 may be used to provide an indication to enter battery swap mode as described herein.

Figure 9B:
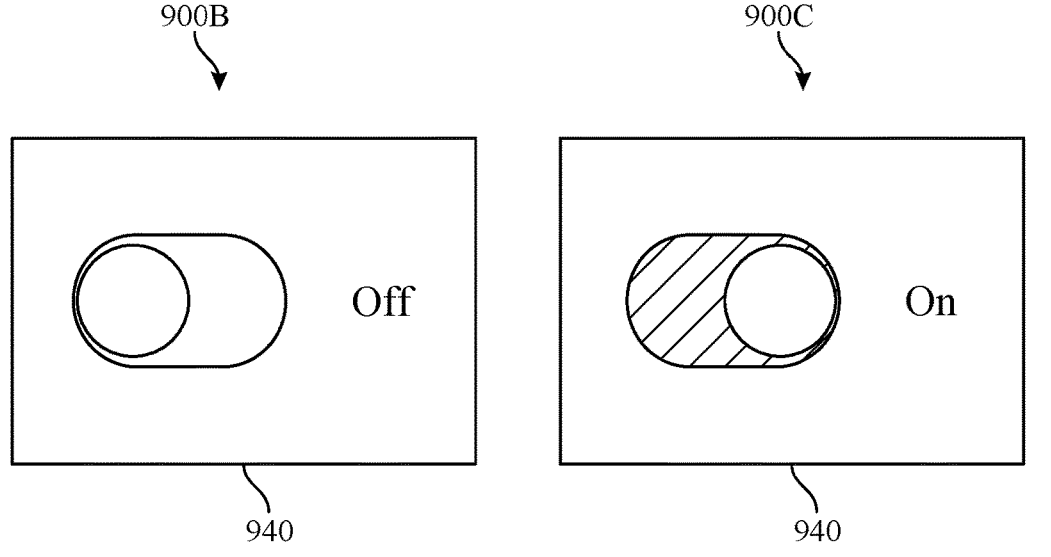
FIG. 9B illustrates an example display for controlling battery hot swapping using software, in accordance with certain aspects of the present disclosure.

FIG. 9B illustrates an example display 940 for battery hot swapping control and visual indication using software, showing two different states (e.g., states 900B, 900C), in accordance with certain aspects of the present disclosure. The electrical device 100 (e.g., IoT device) may include a screen or touchscreen that displays an indicator associated with the hot swap mode (e.g., illustrating whether hot swap mode is enabled), as shown. In this example, the display 940 may display an "OFF" indicator if hot swap mode is not enabled (illustrated by state 900B), or may display an "ON" indicator if hot swap mode is enabled (illustrated by state 900C). This indication via display 940 may also be accompanied by other indications, which may include a visual indication (e.g., an LED, which may be constant or blinking during hot swap mode) and/or aural (e.g., a speaker tone or periodic beep or haptics vibration).

Figure 10:
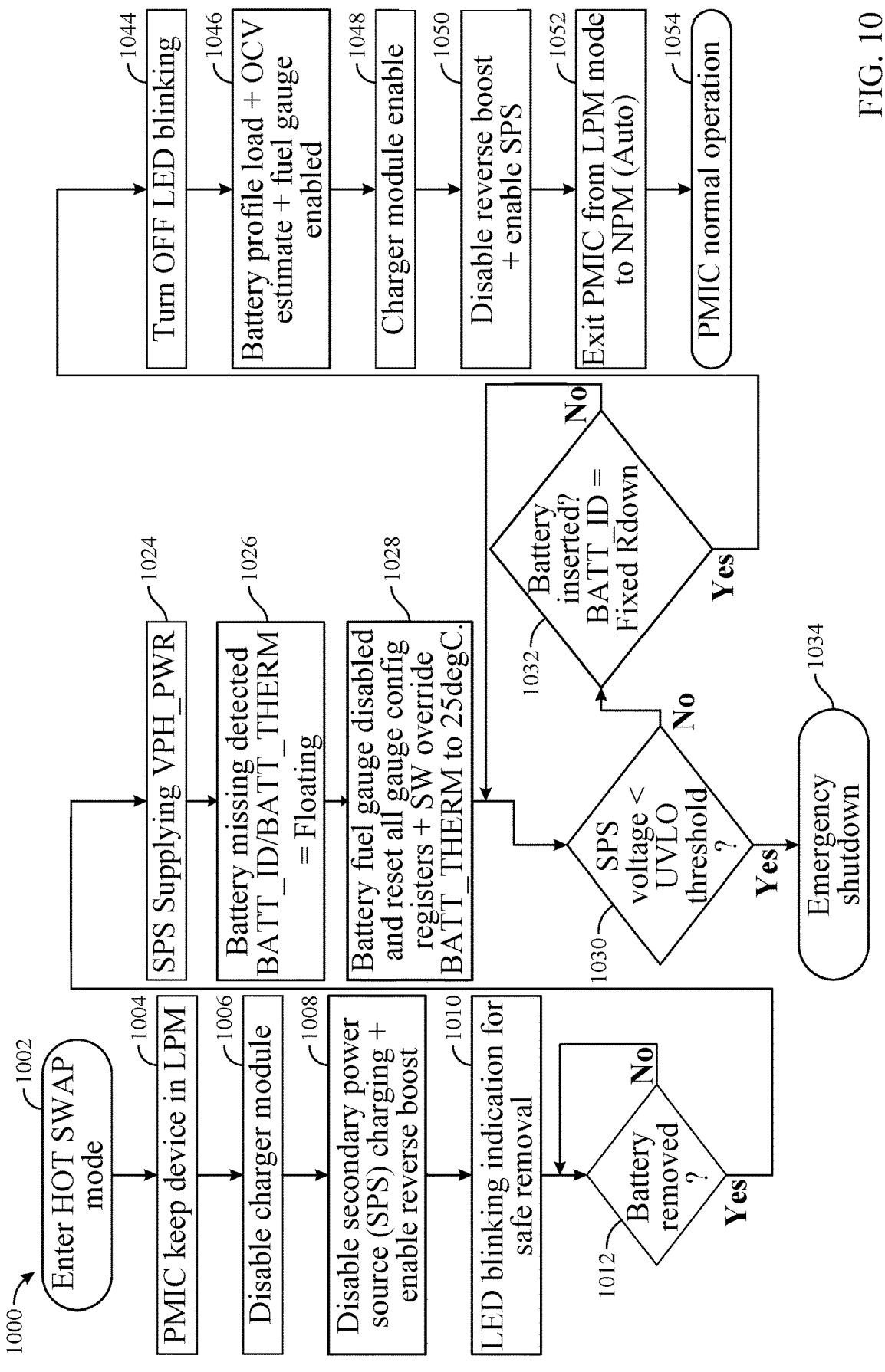
FIG. 10 is a flow diagram illustrating example operations for battery hot swapping, in accordance with certain aspects of the present disclosure.

FIG. 10 is a flow diagram illustrating example operations 1000 for battery hot swapping, in accordance with certain aspects of the present disclosure. The operations 1000 may be performed, for example, by a PMIC (e.g., PMIC 310, 611, or 710) of a power supply circuit (e.g., power supply circuit 300, 400, 600, or 700).

The operations 1000 may begin, at block 1002, where the power supply circuit may enter hot swap mode. After entering hot swap mode, operations may transition to block 1004, where the PMIC may transition the electrical device 100 to low power mode (LPM). In some aspects, prior to entering the hot swap mode, the PMIC may be in a charging of state of the PPS 320 and/or SPS 330. The operations 1000 may proceed to block 1006, where the PMIC may disable charging of the PPS 320. The operations 1000 may also proceed to block 1008, where the PMIC may disable charging of the SPS 330 (e.g., disable the LDO regulator 350 or open current control switch 610) and enable reverse boost. For example, the PMIC may enable boost mode (e.g., enable boost converter 340, switching regulator 630, or boost operations via transistors Q2 and Q3), so that the SPS 330 may provide electrical power to the output node 362. The operations 1000 may then proceed to block 1010, where a blinking LED indication (e.g., or any type of indication) may indicate that the PPS 320 (e.g., battery) may be safely removed. The blinking LED indication may be a constant or blinking LED indication, and may be accompanied by an aural indication (e.g., a speaker tone or periodic beep), in some aspects. At block 1012, it may be determined whether the PPS 320 has been removed. When the PPS 320 is removed, then operations 1000 may proceed to block 1024.

At block 1024, the SPS 330 may begin to supply electrical power to the output node 362 (VPH_PWR), as described herein with respect to FIGS. 4C and 7C. The operations 1000 may then proceed to block 1026, where the PMIC may detect that PPS 320 (e.g., battery) has been removed (e.g., BATT ID/BATT THERM port is floating). The operations 1000 may then proceed to block 1028, where a battery fuel gauge (e.g., a register) show remaining voltage for the PPS 320) may be disabled, and all gauge configuration registers may be reset. In addition, the PMIC may set a software override parameter BATT_THERM to a configured level (e.g., corresponding to 25 degrees Celsius) when the PPS 320 is removed, in order to avoid any functional impacts to the electrical device 100 (e.g., due to thermal throttling).

The operations 1000 may then proceed to block 1030, where the PMIC may determine if the SPS 330 voltage is less than a threshold (e.g., UVLO threshold). When the SPS 330 voltage is more than or equal to the threshold, then the operations 1000 may proceed to block 1032, and the PMIC may determine if a battery has been inserted. When the SPS 330 voltage is less than or equal to the threshold, then the operations 1000 proceed to block 1034, where the PMIC will perform an emergency shutdown of the power supply circuit and electrical device 100, as described herein. At block 1032, when the PMIC determines that a battery has been inserted, then operations will proceed to block 1044.

At block 1044, the blinking LED indication may be turned off, and the operations 1000 may proceed to block 1046. At block 1046, the PMIC may load a profile associated with the inserted battery (e.g., PPS 320), and may perform an open circuit voltage (OCV) estimate, and enable the fuel gauge (register) configured to show the voltage of the PPS 320. The operations may then proceed to block 1048, where the charger module may be enabled (e.g., charging of the SPS 330 is enabled). The operations 1000 may then proceed to block 1050, where boost operations (e.g., boost converter 340 or switching regulator 630) may be disabled, and the SPS operations may be enabled (e.g., operations for providing power via SPS to output node 362). The operations 1000 may then proceed to block 1052, where the PMIC may exit from low power mode and enter normal power mode. The operations 1000 may then proceed to block 1054, where the PMIC 710 may operate in normal mode, as described herein.

Example Power Supply Circuit for True Hot Swap

Certain aspects of the present disclosure have described a battery hot swap technique. For the battery hot swap technique, the electrical device may not go through a full cold boot while replacing the battery. Instead, the electrical device enters a low power state once the battery (e.g., PPS 320) is removed and reverts back to the original state (e.g., normal state of operation) after inserting a charged battery. The hot swap state may be initiated by a user input. Some aspects of the present disclosure are directed to a hot swap technique (e.g., also referred to as a true hot swap) that allows for the removal of the battery (e.g., PPS) without the electrical device entering a low-power state, and in some aspects, without manual intervention (e.g., reception of user input indicating to enter a swap mode).

Performing a true hot swap may enable improved productivity for the electrical device 100, because the electrical device 100 may continue normal operations a battery is being swapped (e.g., the SPS may take over immediately to facilitate normal operations). As a result, true battery hot swap may provide uninterrupted electrical device operation.

Figure 11:
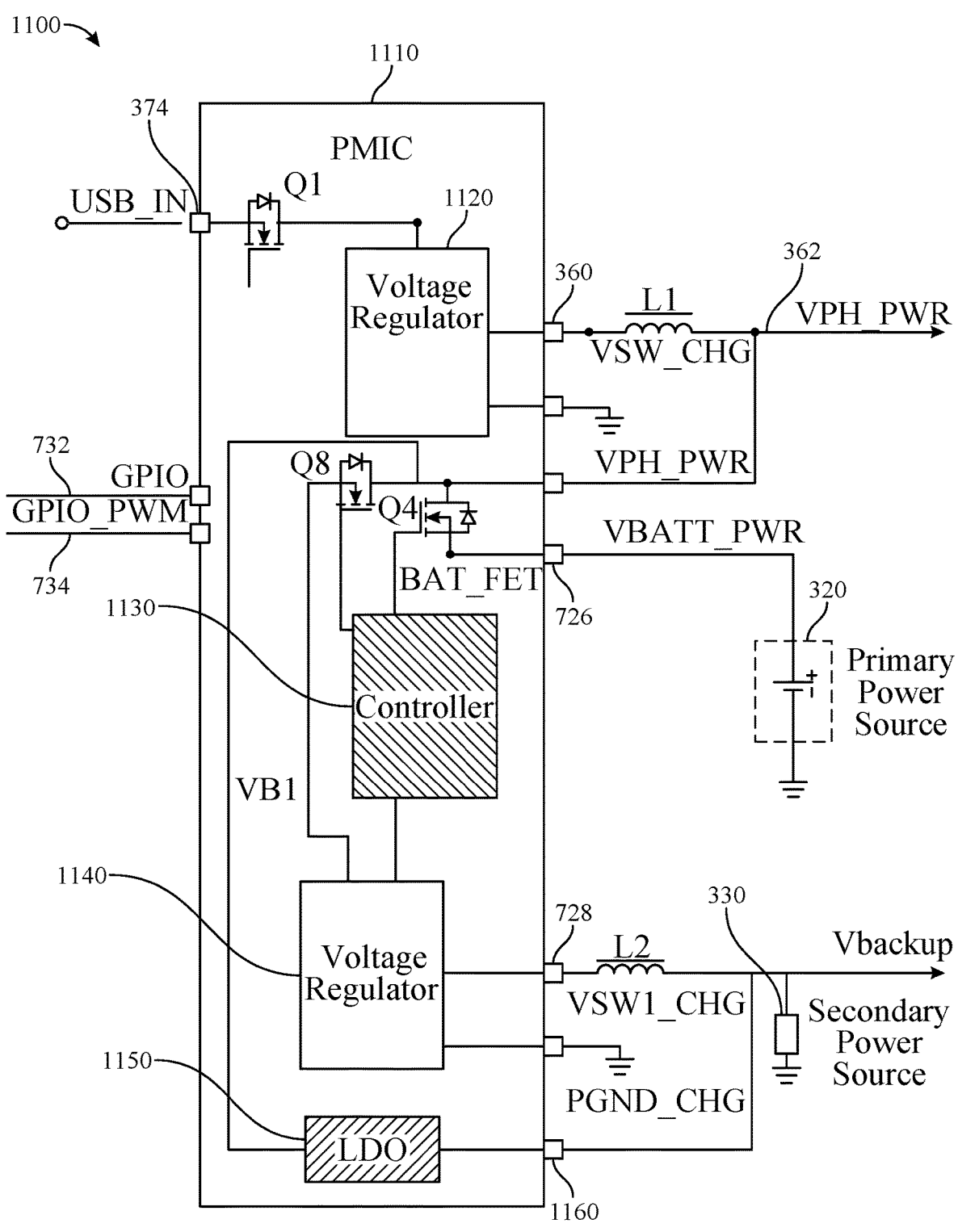
FIG. 11 is a block diagram of an example power supply circuit with a PMIC supporting true hot swapping, in accordance with certain aspects of the present disclosure.

FIG. 11 is a block diagram of an example power supply circuit 1100 with a PMIC 1110 supporting true hot swapping or warm swap, in accordance with certain aspects of the present disclosure. The power supply circuit 1100 may include the PMIC 1110, the PPS 320, the SPS 330, a voltage regulator 1120, a controller 1130, a voltage regulator 1140, and an LDO regulator 1150. According to certain aspects, the PMIC 1110 may include the voltage regulator 1120, the controller 1130, the voltage regulator 1140, and the LDO regulator 1150.

Transistor Q1 (e.g., switch) may be coupled between the input voltage node (USB_IN) and the voltage regulator 1120. The voltage regulator 1120 may be coupled to the output node 362 (VPH_PWR) and inductive element L1 (e.g., through port 360). The voltage regulator 1120 may also be coupled to the controller 1130 through port 360, inductor L1, and transistor Q4. The controller 1130 may be coupled to the PPS 320 via port 726, and the voltage regulator 1140 through transistor Q8. The second voltage regulator 1140 may be coupled to the SPS 330 through port 728 and inductive element L2. The LDO 1150 may be coupled to port 1160 and the SPS 330. In certain aspects, the voltage regulator 1140 may be implemented using a current control loop (e.g., for controlling charging current to SPS 330), and the output current of the voltage regulator 1140 may be based on a programmable set value.

Figure 12A:
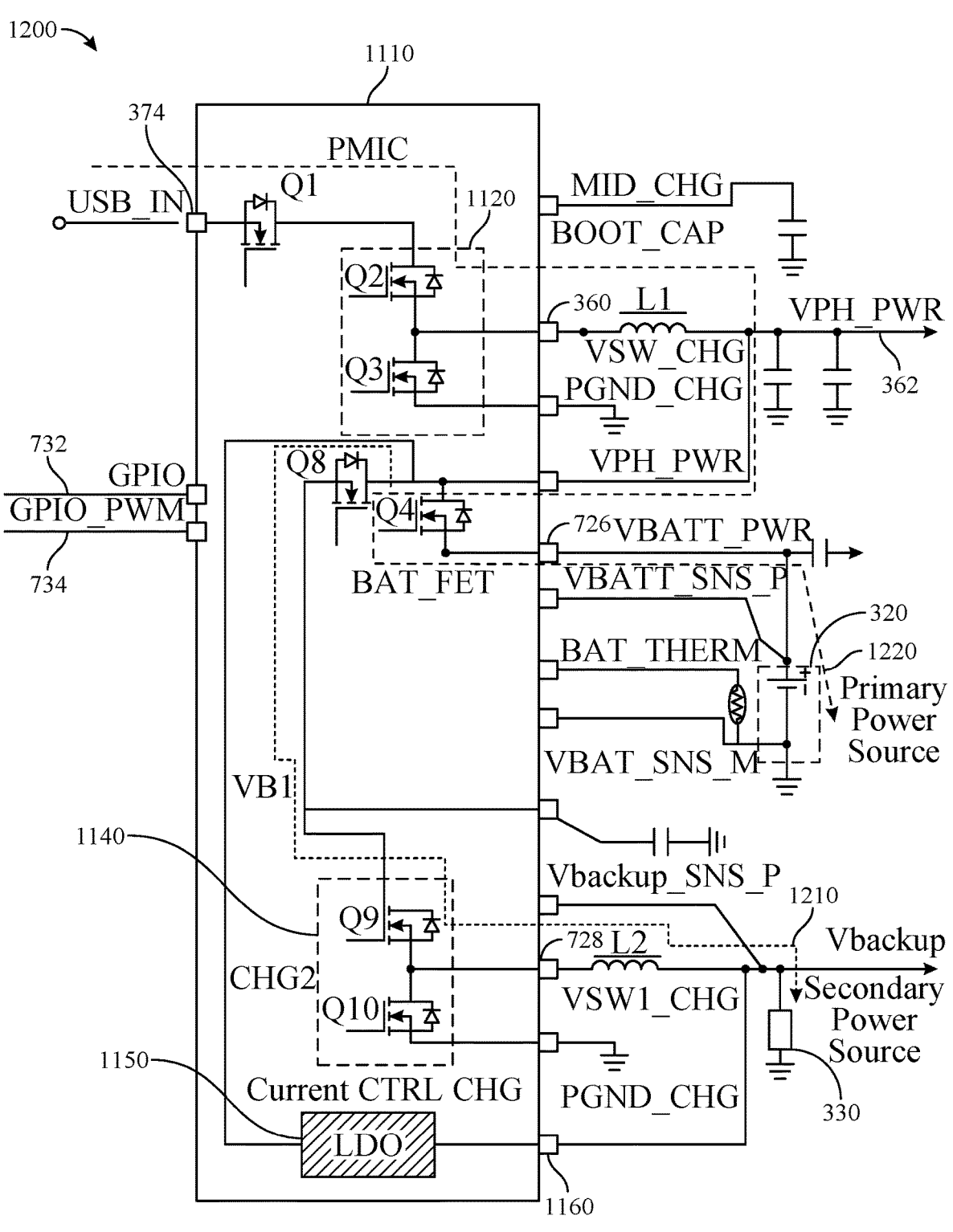
FIG. 12A, FIG. 12B, and FIG. 12C illustrate example current paths for a power supply circuit supporting true hot swapping, in accordance with certain aspects of the present disclosure.

FIG. 12A is a circuit diagram of an example power supply circuit 1200 (e.g., corresponding to power supply circuit 1100) and illustrating example current paths for the charging the PPS (e.g., using current path 1220) and charging the SPS (e.g., using current path 1210), in accordance with certain aspects of the present disclosure. The power supply circuit 1200 may be similar to the power supply circuit 1100, and may include the PMIC 1110, the voltage regulator 1120, the controller 1130, the voltage regulator 1140, and the LDO 1150. In certain aspects, the voltage regulator 1120 may be implemented as a switching regulator via transistors Q2 and Q3 and inductive element L1 coupled to output node 362 (VPH_PWR). The voltage regulator 1140 may be implemented as a switching regulator formed by transistors Q9 and Q10 and inductive element L2 coupled to SPS 330.

According to certain aspects, the power supply circuit 1200 may be connected to and receive electrical power from the input voltage node (USB_IN) via the port 374. The received power from the port 374 may be used to charge the PPS 320 (as illustrated by current path 1220), as well as being used to charge the SPS 330 (as illustrated by current path 1210). The PPS 320 and the SPS 330 may be charged to a threshold voltage, and the PMIC 1110 (e.g., using controller 1130).

When USB input power is available, software may be programmed to configure the charging currents for the PPS 320 and the SPS 330 (e.g., by controlling transistors Q4, Q8, and/or voltage regulator 1140). For example, if the input power is 10 Watts (W), 8 W may be used for charging PPS 320, and 2 W may be used for charging SPS 330.

Electrical power may be provided from port 374 through transistor Q1 to transistor Q2. Transistors Q2, Q3 and inductive element L1 may perform buck operations to generate a regulated voltage at the output node 362. The electrical power may be provided from output node 362, through transistor Q8 to regulator 1140. Transistors Q9 and Q10 of regulator 1140 and inductive element L2 may perform buck operations to generate a regulated voltage for charging the SPS 330 via port 728. In this example, the electrical power may also be provided from the output node 362 through transistor Q4 to charge the PPS 320 via port 726. Here, transistor Q4 is activated to provide the electrical power to the PPS 320.

Figure 12B:
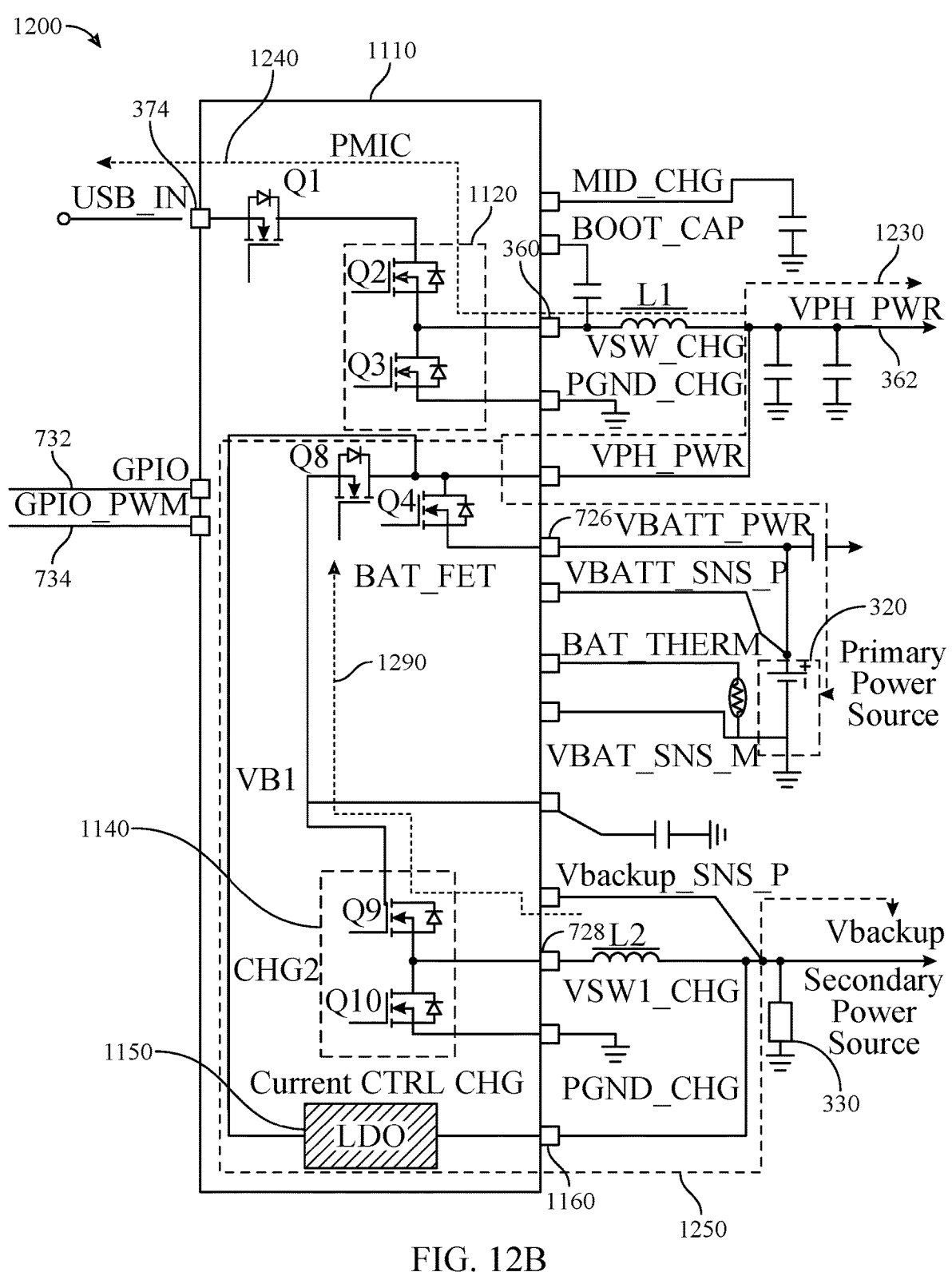

FIG. 12B illustrates example current paths for PPS operation (e.g., using current path 1230) and SPS charging (e.g., using current path 1250), along with an example path for optional USB On-The-Go (OTG) operation (e.g., using current path 1240), in accordance with certain aspects of the present disclosure.

In the example of FIG. 12B, the voltage regulator 1120 may perform boost operations to generated a boosted voltage at port 374 based on the voltage at the output node 362 (VPH_PWR)). According to certain aspects, the power supply circuit 1200 may operate using electrical power from the PPS 320 when electrical power from the input voltage node (USB_IN) via port 374 is not available. In this case, the PPS 320 may supply electrical power to both the output node 362 (VPH_PWR) (e.g., using current path 1230), and to the SPS 330 via port 728 (e.g., using current path 1250), in order to both power the electrical device 100 and charge the SPS 330. For example, the electrical power may be provided from PPS 320 through transistor Q4 to the output node 362 (VPH_PWR). The electrical power may be provided from the PPS 320 through transistor Q4 to the LDO regulator 1150. The LDO regulator 1150 may generate a regulated voltage that is provided to port 1160 and to the SPS 330 for charging. The regulated voltage also provides a backup voltage (Vbackup). In addition, the LDO regulator 1150 may be enabled and control current to allow for the charging of the SPS 330. Although system load may not be provided by the SPS 330 while PPS 320 is being used, there might be power leakage from SPS 330 resulting in a drop of SPS charge. In some cases, software may be configured to receive a voltage measurement associated with the SPS and activate SPS charging from main the PPS 320 (e.g., based on the voltage measurement meeting a programmable threshold), as described herein.

USB OTG allows for USB devices (e.g., electrical devices 100) to act as a host, allowing other electrical devices (e.g., USB flash drives, digital cameras, mouse, or keyboards) to be attached and powered. Use of USB OTG allows for electrical devices to switch back and forth between the roles of host and device. USB OTG mode may be enabled when a device is detected at port 374 (USB_IN). For example, when the PPS 320 is supplying electrical power to the electrical device 100 and USB OTG mode is enabled, electrical power may be provided from PPS 320 to port 374 for powering an attached device. For instance, the voltage regulator 1120 may perform boost operations to generate a boosted voltage at port 374 based on the power at the output node 362 supplied by PPS 320.

In some aspects, with the PPS 320 being used to supply power to output node 362, a boosted voltage may be generated at the source of transistors Q8 (e.g. using current 1920) using SPS 330, allowing for rapid supply of power from SPS 330 in the event that the PPS 320 is removed. For example, transistors Q9, Q10 and inductive element L2 may be used to perform boost operations for generating the boosted voltage at the source of transistor Q8. Once the PPS 320 is removed, transistor Q8 may be activated to supply power to the output node 362 via SPS 330, as described in more detail herein.

Figure 12C:
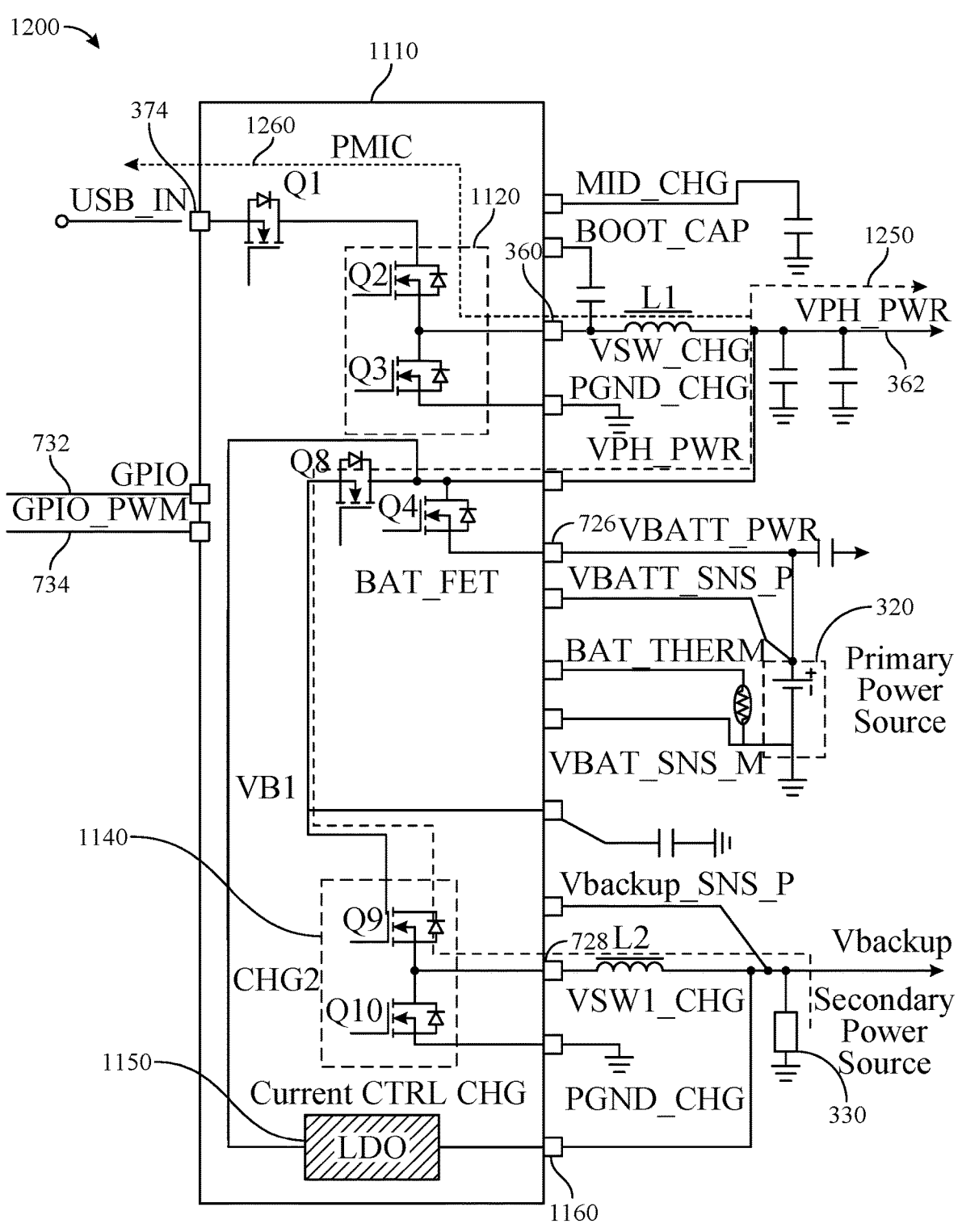

FIG. 12C illustrates an example current path 1250 for the SPS operation during battery hot swap, along with an example current path 1260 for optional USB OTG operation, in accordance with certain aspects of the present disclosure.

According to certain aspects, the power supply circuit 1200 may be operating using electrical power from the PPS 320. PPS 320 may be hot swapped while the SPS 330 provides electrical power to the electrical device 100. In this case, the SPS 330 may supply electrical power to the output node 362 (VPH_PWR) to power the electrical device 100. For example, the electrical power from SPS 330 may be provided to regulator 1140 including transistors Q9 and Q10. Transistors Q9 and Q10, along with inductive element L2, may perform boost operations to generate a boosted voltage at source of transistor Q8. In this manner, when the PPS 320 is removed, electrical power is available at source of transistor Q8 to provide power to the output node 362 (VPH_PWR) to power the electrical device 100. In other words, upon removal of the PPS 320, the transistor Q4 may be deactivated and the transistors Q8 may be activated to provide power to the output node 362 from SPS 330. The SPS 330 may continue to provide electrical power to the output node 362 (VPH_PWR) until a new PPS 320 is inserted. Here, transistor Q4 (e.g., switch) is open, such that the PPS 320 can be removed and replaced. Moreover, the voltage regulator 1120 may perform boost operations to generate a boosted voltage at port 374 based on the voltage at the output node 362 (VPH_PWR)) for USB OTG.

Figure 13:
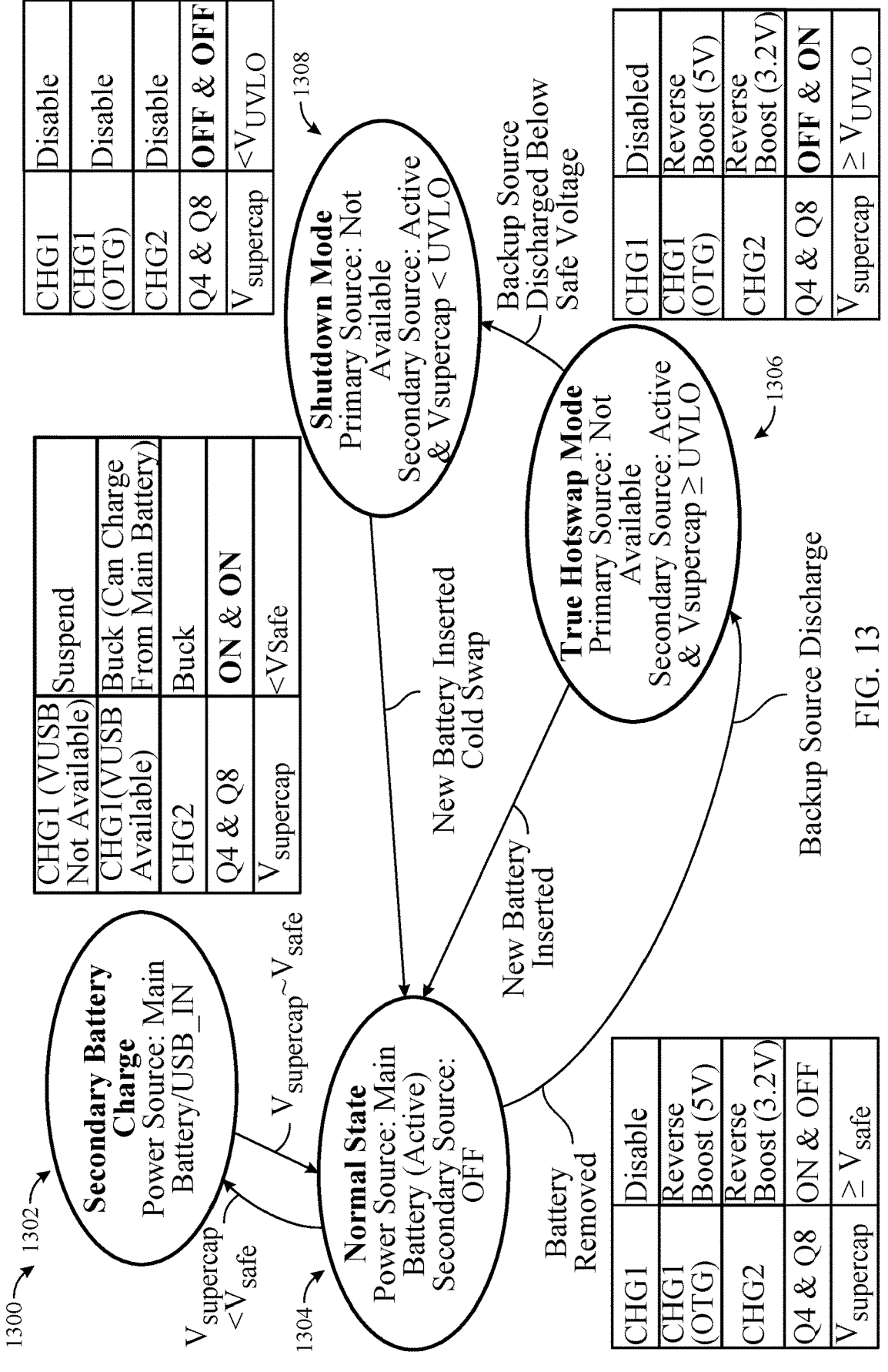
FIG. 13 is a state diagram illustrating operations of a power supply circuit of supporting true hot swapping, in accordance with certain aspects of the present disclosure.

FIG. 13 is a state diagram illustrating the operations 1300 of a power supply circuit (e.g., performed by power supply circuit 1100 or 1200), in accordance with certain aspects of the present disclosure. The operations 1300 may be facilitated, for example, by the PMIC 1110 of the power supply circuits 1100, 1200.

The operations 1300 may optionally begin at state 1304, where the power supply circuit may operate in a normal state (e.g., normal power mode). In the normal state, the PPS 320 may provide electrical power to the electrical device 100. In the normal state, the SPS 330 is not being used for providing power for the electrical device 100. The electrical device 100 may operate in normal power mode. In some aspects, the voltage regulator 1120 may be disabled (e.g., when USB OTG is disabled), or may be configured as a boost converter (when USB OTG is enabled) in the normal state to provide power at port 374. The voltage regulator 1140 may also be configured as a boost converter in the normal state, providing power at source of transistor Q8, as described.

In some cases, the voltage regulator 1140 may maintain a lower voltage (e.g., 3.2V) at drain of transistor Q8 than voltage the voltage of PPS 320 (e.g., equals the minimum system operating voltage or less than 5% SOC equivalent voltage of the PPS 320). In some aspects, the PMIC may monitor the voltage at the source and drain of transistor Q8 as an indicator of the system is operating on PPS power or SPS power. For example, the source voltage of transistor Q8 being less than the drain voltage of transistor Q8 may be indicative of power being from PPS 320. On the other hand, the source voltage of transistor Q8 being more than the drain voltage of transistor Q8 may be indicative of power being from SPS 330.

Transistor Q4 may be active (e.g., closed) to allow electrical power to be provided from PPS 320 to the output node 362 (VPH_PWR), and transistor Q8 may be turned off (e.g., transistor Q4 may be off but conduction may occur through body diode of transistor Q8). The voltage regulator 1140 may maintain a lower voltage (e.g., 3.2V) at drain of transistor Q8 than the voltage of PPS 320. When the SPS voltage drops a threshold, the regulator 1150 may be activated to charge the SPS. Once SPS has reached to charge threshold, regulator 1150 may be disabled and regulator 1140 may be actived in reverse boost. The power supply circuit may continue to operate in the normal state as long as the voltage of the SPS 330 equal to or less than a specified safe voltage (labeled "Vsafe"). When the voltage at the SPS 330 is less than the specified voltage (Vsafe), the operations 1300 may proceed to state 1302.

At state 1302, the PMIC may determine whether the power supply circuit 1100, 1200 may charge from port 374 (USB_IN). When there is no voltage available at port 374 (USB_IN), then voltage regulator 1120 may be suspended (e.g., disabled). When there is voltage available at port 374 (USB_IN), then voltage regulator 1120 may be enabled and may be configured as a buck converter to enable charging of the PPS 320 and providing power to the output node 362. The voltage regulator 1140 may be enabled and may be configured as a buck converter to enable charging of the SPS 330 (via power from port 374 (USB_IN) and/or the PPS 320). In addition, transistors Q4 and Q8 may be activated (e.g., closed) in state 1302 to allow for the routing of electrical power to both the PPS 320 and the SPS 330.

The power supply circuit may continue to operate in state 1302 while the voltage at the SPS 330 is less than Vsafe. When the voltage of the SPS 330 becomes equal to Vsafe, the operations 1300 proceed to state 1304.

For true hot swap, when the PPS 320 (e.g., battery) is removed, the operations 1300 proceed to state 1306. Transistor Q4 is deactivated and transistors Q8 is activated. The SPS 330 may provide electrical power to output node 362. Similarly, when USB OTG is operating while the PPS 320 (e.g., battery) is removed, the regulator 1120 may generate a voltage at port 374. In this manner, the power supply circuit provides power to the electrical device 100 until a new PPS 320 (e.g., a new battery or a previously used battery that has been charged) is attached. In certain aspects, for a warm swap use case, port 732 may be used to set a warm swap active state where the device (e.g., device 100) enters a low power mode and port 734 provides a safe battery removal indication.

According to certain aspects, the voltage regulator 1120 may be disabled (e.g., when USB OTG is disabled), or may be configured as a boost converter (e.g., when USB OTG is enabled). The power supply circuit may continue to operate in state 1306 as long as the voltage of the SPS 330 is greater than or equal to a threshold (e.g., the UVLO threshold voltage).

During state 1306, PMIC 1110 may communicate (e.g., to processor 104) that the PMIC is running on backup power. Power consumption of the electrical device 100 may be adjusted based on a user configuration to reduce power consumption (e.g., by dimming display brightness or reducing core operating frequency). When a new PPS 320 (e.g., battery) is inserted, then the operations 1300 may proceed to state 1304, which is described above. If in state 1306, the SPS 330 is discharged below a threshold (e.g., UVLO threshold voltage), then the operations 1300 proceed to state 1308.

At state 1308, the power supply circuit may operate in shutdown mode. In shutdown mode, the voltage regulator 1120 may be disabled. The voltage regulator 1140 may also be disabled in shutdown mode. The power supply circuit may continue in shutdown mode until a new battery is inserted and a cold boot is performed, at which point operations 1300 return to state 1304.

Example Operations for Supplying Power

Figure 14:
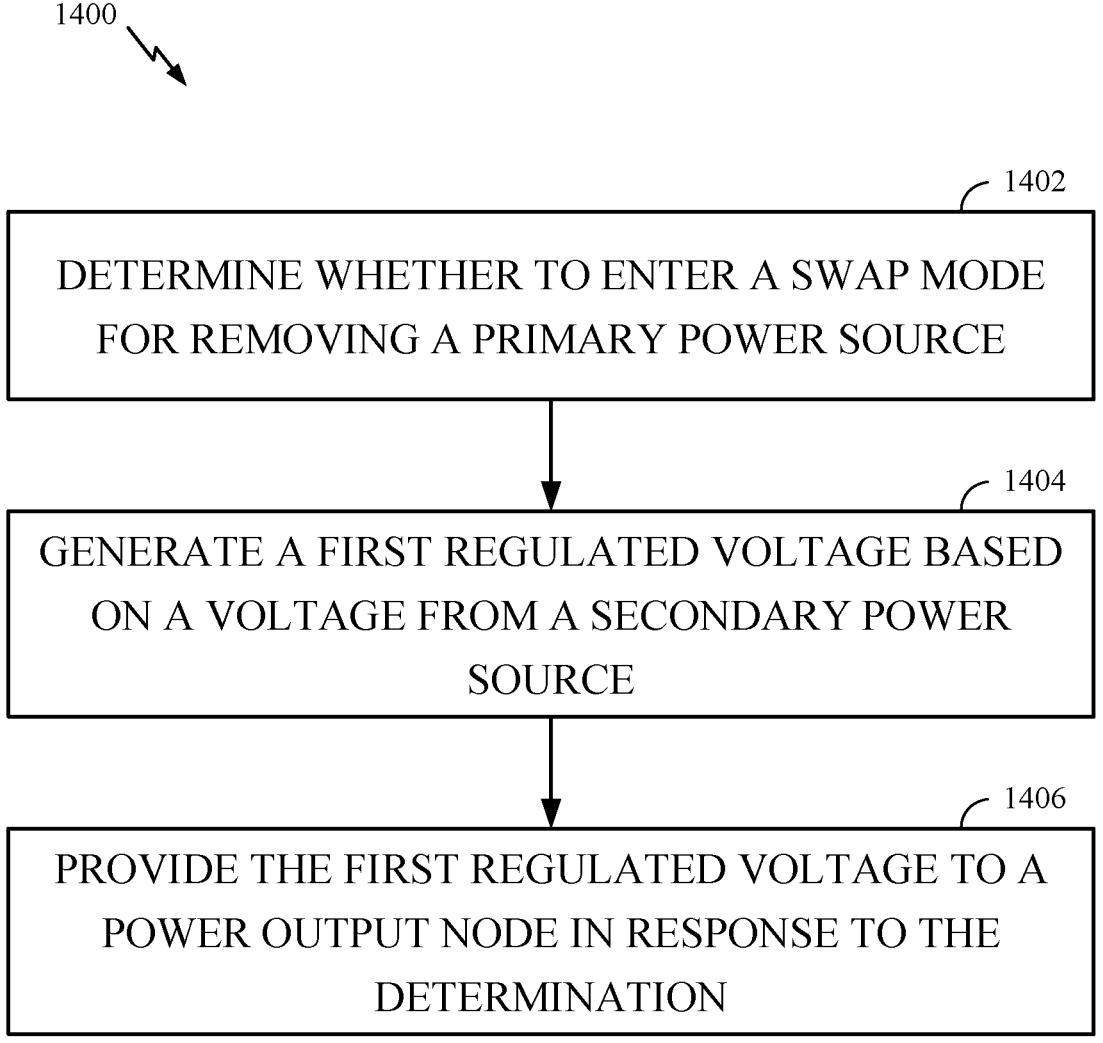
FIG. 14 is a flow diagram of example operations for supplying power, in accordance with certain aspects of the present disclosure.

FIG. 14 is a flow diagram illustrating example operations 1400 for signal generation, in accordance with certain aspects of the present disclosure. The operations 1400 may be performed by a device (e.g., device 100) including a power supply circuit, such as the power supply circuit 400, the power supply circuit 600, the power supply circuit 700, the power supply circuit 1100, or the power supply circuit 1200.

At block 1402, the device may determine whether to enter a swap mode for removing a primary power source (e.g., PPS 320). At block 1404, the device may generate a first regulated voltage based on a voltage from a secondary power source (e.g., SPS 330). The first regulated voltage may be generated via a boost converter (e.g., boost converter 340, or boost converter implemented via transistors Q2 and Q4), in some aspects. At block 1406, the device may provide the first regulated voltage to a power output node (e.g., output node 362) in response to the determination. In some aspects, the device may configure the device having the secondary power source in a low power state during the swap mode.

In some aspects, the device may also generate a second regulated voltage based on a voltage from the primary power source and charge the secondary power source via the second regulated voltage. In some aspects, the device may provide a charging voltage from the primary power source to the secondary power source through a transistor (e.g., transistor Q6 of FIG. 7B) configured as a current controlled linear charger.

In some aspects, the device may generate a first output voltage via a SMPS (e.g., implemented via transistors Q2 and Q3) operated as a buck converter based on an input voltage from a port (e.g., USB port 374). The device may provide the first output voltage to the power output node. The device may also generate a second output voltage via the SMPS operated as a boost converter based on a voltage from the primary power source and provide the second output voltage to the port.

In some aspects, the first regulated voltage may be generated at a first terminal of a switch (e.g., transistor Q8 of FIG. 12B) prior to entering the swap mode, a second terminal of the switch being coupled to the power output node. Providing the first regulated voltage to the power output node may include closing the switch in response to the primary power source being removed.

Example Aspects

In addition to the various aspects described above, specific combinations of aspects are within the scope of the disclosure, some of which are detailed below:

Aspect 1. An integrated circuit (IC) for power management, the IC comprising: a first power supply node; a second power supply node; a first port for coupling to a primary power source; a first switch coupled between the first power supply node and the first port; a second port for coupling to a secondary power source; a second switch coupled between the first power supply node and the second port; and a third switch coupled between the first power supply node and the second power supply node.

Aspect 2. The IC of aspect 1, further comprising: a third power supply node; a voltage regulator coupled between the third power supply node and the first power supply node; and a fourth switch coupled between the third power supply node and the second power supply node.

Aspect 3. The IC of aspect 2, wherein for a hot swap mode: the first switch is configured to be open, such that the primary power source can be replaced; the third switch is configured to be open; the second switch and the fourth switch are configured to be closed; and the voltage regulator is configured to be enabled in a reverse boost direction, such that the secondary power source can provide power to the second power supply node via the second switch, the voltage regulator, and the fourth switch.

Aspect 4. The IC of aspect 3, wherein the voltage regulator is configured as a buck converter in a forward direction and as a boost converter in the reverse boost direction.

Aspect 5. The IC of any one of aspects 3-4, further comprising a fourth port configured to receive a control signal for enabling the hot swap mode.

Aspect 6. The IC of aspect 5, further comprising a fifth port for coupling to an indicator for indicating the hot swap mode is enabled.

Aspect 7. The IC of any one of aspects 2-6, further comprising: a third port for coupling to a charger; and a fifth switch coupled between the third port and the third power supply node, wherein for a charging mode: the fourth switch is configured to be open; the first switch, the second switch, the third switch, and the fifth switch are configured to be closed; and the voltage regulator is configured to be enabled in a forward direction, such that the charger can: charge the primary power source via the fifth switch, the voltage regulator, and the first switch; charge the secondary power source via the fifth switch, the voltage regulator, and the second switch; and provide power to the second power supply node via the fifth switch, the voltage regulator, and the third switch.

Aspect 8. The IC of aspect 1, wherein for a normal operating mode, the first switch and the third switch are configured to be closed, such that the primary power source can provide power to the second power supply node.

Aspect 9. The IC of aspect 8, wherein for the normal operating mode, the second switch is configured to be closed while a voltage associated with the secondary power source is below a threshold voltage, such that the primary power source can charge the secondary power source.

Aspect 10. The IC of any one of aspects 1-9, wherein for a hot swap mode: the second switch and the third switch are configured to be closed, such that the secondary power source can provide power to the second power supply node; and the first switch is configured to be open, such that the primary power source can be replaced.

Aspect 11. A portable device comprising the IC of any one of aspects 1-10, further comprising: the primary power source coupled to the first port of the IC; the secondary power source coupled to the second port of the IC; and one or more circuits coupled to, and configured to receive power via, the second power supply node.

Aspect 12. The portable device of aspect 11, wherein the primary power source comprises a first battery and wherein the secondary power source comprises a second battery or a supercapacitor.

Aspect 13. The portable device of any one of aspects 11-12, wherein the portable device comprises an Internet of Things (IoT) device.

Aspect 14. The portable device of any one of aspects 11-13, further comprising: an interface for a user of the portable device to selectively control the portable device to enter a hot swap mode; and an indicator configured to indicate to the user that the portable device is in the hot swap mode.

Aspect 15. The portable device of aspect 14, further comprising a display, wherein the display is configured to display at least one of the interface or the indicator.

Aspect 16. The portable device of any one of aspects 14-15, wherein the interface comprises a slider switch, a toggle switch, or a push button switch.

Aspect 17. The portable device of any one of aspects 14-16, wherein the indicator comprises a light-emitting diode or a speaker or a vibration device.

Aspect 18. An integrated circuit (IC) for power management, the IC comprising: a power supply node; a first port for coupling to a primary power source; a first switch coupled between the power supply node and the first port; a second port for coupling to a secondary power source; a first voltage regulator coupled between the power supply node and the second port; a third port for coupling to the secondary power source through an inductive element; a second voltage regulator comprising a first node coupled to the third port; and a second switch coupled between the power supply node and a second node of the second voltage regulator.

Aspect 19. The IC of aspect 18, wherein the first voltage regulator comprises a low-dropout (LDO) regulator and wherein the second voltage regulator comprises a buck converter in a forward direction from the second node to the first node and a boost converter in a reverse direction from the first node to the second node.

Aspect 20. The IC of any one of aspects 18-19, wherein for a hot swap mode: the second switch is configured to be closed; the second voltage regulator is configured to be enabled in a reverse boost configuration, such that the secondary power source can provide power to the power supply node via the second voltage regulator and the second switch; and the first switch is configured to be open after primary power source is removed.

Aspect 21. The IC of aspect 20, further comprising a fourth port configured to receive a control signal for enabling the hot swap mode.

Aspect 22. The IC of aspect 21, further comprising a fifth port for coupling to an indicator for indicating the hot swap mode is enabled.

Aspect 23. The IC of any one of aspects 18-22, wherein for a normal operating mode: the first switch is configured to be closed; and the second switch is configured to be open, such that the primary power source can provide power to the power supply node and can charge the secondary power source via the first voltage regulator.

Aspect 24. The IC of aspect 23, wherein for the normal operating mode, the second voltage regulator is configured to be enabled in a reverse boost configuration.

Aspect 25. The IC of any one of aspects 18-24, further comprising: a fourth port for coupling to a charger; a fifth port for coupling to the power supply node; a third voltage regulator including a first node coupled to the fifth port; and a third switch coupled between the fourth port and a second node of the third voltage regulator.

Aspect 26. The IC of aspect 25, wherein for a charging mode: the first switch, the second switch, and the third switch are configured to be closed; the third voltage regulator is configured to be enabled, such that the charger can charge the primary power source via the third voltage regulator; and the second voltage regulator is configured to be enabled, such that the charger can charge the secondary power source via the third voltage regulator and the second voltage regulator.

Aspect 27. A portable device comprising the IC of aspect 18, further comprising: the primary power source coupled to the first port of the IC; the secondary power source coupled to the second port of the IC; an inductive element coupled between the third port of the IC and the secondary power source; and one or more circuits coupled to, and configured to receive power via, the power supply node.

Aspect 28. The portable device of aspect 27, wherein the primary power source comprises a first battery and wherein the secondary power source comprises a second battery or a supercapacitor.

Aspect 29. The portable device of any one of aspects 27-28, wherein the portable device comprises an Internet of Things (IoT) device.

Aspect 30. The portable device of any one of aspects 27-29, further comprising: an interface for a user of the portable device to selectively control the portable device to enter a hot swap mode; and an indicator configured to indicate to the user that the portable device is in the hot swap mode.

Aspect 31. The portable device of aspect 30, further comprising a display, wherein the display is configured to display at least one of the interface or the indicator.

Aspect 32. The portable device of any one of aspects 30-31, wherein the interface comprises a slider switch, a toggle switch, or a push button switch.

Aspect 33. The portable device of any one of aspects 30-32, wherein the indicator comprises a light-emitting diode (LED) or a speaker or vibration device.

Aspect 34. A power supply circuit for a portable device, the power supply circuit comprising: a first power supply node; a second power supply node for coupling to a primary power source; a first switch coupled between the first power supply node and the second power supply node; a third power supply node for coupling to a secondary power source; a first voltage regulator comprising an input coupled to the first power supply node and an output coupled to the third power supply node; a second voltage regulator comprising an input coupled to the third power supply node and an output coupled to the first power supply node; and an integrated circuit (IC) comprising a first port coupled to the first power supply node and a second port coupled to the third power supply node and configured to sense a parameter associated with the secondary power source, wherein the IC is configured to control charging of the secondary power source based on the sensed parameter.

Aspect 35. The power supply circuit of aspect 34, wherein the IC further comprises an analog-to-digital converter (ADC) including an input coupled to the second port of the IC.

Aspect 36. The power supply circuit of any one of aspects 34-35, wherein the IC further comprises a third port coupled to an enable input of the first voltage regulator and wherein the IC is configured to selectively enable the first voltage regulator using the third port based on the sensed parameter at the second port.

Aspect 37. The power supply circuit of aspect 36, wherein the IC further comprises a fourth port coupled to an enable input of the second voltage regulator.

Aspect 38. The power supply circuit of any one of aspects 34-37, wherein the first voltage regulator comprises a low-dropout (LDO) regulator and wherein the second voltage regulator comprises a boost converter.

Aspect 39. The power supply circuit of any one of aspects 34-38, wherein for a hot swap mode: the first switch is configured to be open, such that the primary power source can be replaced; the first voltage regulator is configured to be disabled; and the second voltage regulator is configured to be enabled, such that the secondary power source can provide power to one or more circuits of the portable device via the second voltage regulator and the first power supply node.

Aspect 40. The power supply circuit of any one of aspects 34-39, wherein for a normal operating mode in which one or more circuits of the portable device are configured to be powered by the primary power source: the first switch is configured to be closed; the first voltage regulator is configured to be enabled; and the second voltage regulator is configured to be disabled, such that the primary power source can charge the secondary power source via the first voltage regulator.

Aspect 41. The power supply circuit of any one of aspects 34-40, wherein the first voltage regulator and the second voltage regulator are configured to be disabled based on a voltage at the second port being above a threshold.

Aspect 42. A method for signal generation, comprising: determining whether to enter a swap mode for removing a primary power source; generating a first regulated voltage based on a voltage from a secondary power source; and providing the first regulated voltage to a power output node in response to the determination.

Aspect 43. The method of aspect 42, wherein the first regulated voltage is generated via a boost converter.

Aspect 44. The method of any one of aspects 42-43, further comprising: generating a second regulated voltage based on a voltage from the primary power source; and charging the secondary power source via the second regulated voltage.

Aspect 45. The method of any one of aspects 42-44, further comprising providing a charging voltage from the primary power source to the secondary power source through a transistor configured as a current controlled linear charger.

Aspect 46. The method of any one of aspects 42-45, further comprising: configuring a wireless device having the secondary power source in a low power state during the swap mode.

Aspect 47. The method of any one of aspects 42-46, further comprising: generating a first output voltage via a switched-mode power supply (SMPS) operated as a buck converter based on an input voltage from a port; providing the first output voltage to the power output node; generating a second output voltage via the SMPS operated as a boost converter based on a voltage from the primary power source; and providing the second output voltage to the port.

Aspect 48. The method of aspect 47, wherein the port comprises a universal serial bus (USB) port.

Aspect 49. The method of any one of aspects 42-48, wherein the first regulated voltage is generated at a first terminal of a switch prior to entering the swap mode, a second terminal of the switch being coupled to the power output node, wherein providing the first regulated voltage to the power output node comprises closing the switch in response to the primary power source being removed.

ADDITIONAL CONSIDERATIONS

The various operations of methods described above may be performed by any suitable means capable of performing the corresponding functions. The means may include various hardware and/or software component(s) and/or module(s), including, but not limited to a circuit, an application-specific integrated circuit (ASIC), or a processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. An integrated circuit (IC) for power management, the IC comprising:
    a first power supply node;
    a second power supply node;
    a third power supply node;
    a first port for coupling to a hot swappable primary power source;
    a first switch coupled between the first power supply node and the first port, the first switch being closed when the primary power source is supplying power to a load and openable to facilitate a hot swap of the primary power source;
    a second port for coupling to a secondary power source;
    a second switch coupled between the first power supply node and the second port, the second switch closable to facilitate a hot swap of the primary power source;
    a third switch coupled between the first power supply node and the second power supply node, the third switch openable to facilitate a hot swap of the primary power source;
    a voltage regulator coupled between the third power supply node and the first power supply node, the voltage regulator configured to enable a reverse boost to facilitate a hot swap of the primary power source; and
    a fourth switch coupled between the third power supply node and the second power supply node, the second switch being open when the primary power source is supplying power to the load and closable to facilitate a hot swap of the primary power source wherein the secondary power source can provide power to the second power supply node via the second switch, the voltage regulator, and the fourth switch.

2. The IC of claim 1, wherein the voltage regulator is configured as a buck converter in a forward and as a boost converter in the reverse boost direction.

3. The IC of claim 1, further comprising:
    a third port for coupling to a charger; and
    a fifth switch coupled between the third port and the third power supply node, wherein for a charging mode:
        the fourth switch is configured to be open;
        the first switch, the second switch, the third switch, and the fifth switch are configured to be closed; and
        the voltage regulator is configured to be enabled in a forward direction, such that the charger can:
            charge the primary power source via the fifth switch, the voltage regulator, and the first switch;
            charge the secondary power source via the fifth switch, the voltage regulator, and the second switch; and
            provide power to the second power supply node via the fifth switch, the voltage regulator, and the third switch.

4. The IC of claim 1, wherein for a normal operating mode, the first switch and the third switch are configured to be closed, such that the primary power source can provide power to the second power supply node.

5. The IC of claim 4, wherein for the normal operating mode, the second switch is configured to be closed while a voltage associated with the secondary power source is below a threshold voltage, such that the primary power source can charge the secondary power source.

6. The IC of claim 1, wherein for a hot swap mode:
    the second switch and the third switch are configured to be closed, such that the secondary power source can provide power to the second power supply node; and
    the first switch is configured to be open, such that the primary power source can be replaced.

7. A portable device comprising the IC of claim 1, further comprising:
    the primary power source coupled to the first port of the IC;
    the secondary power source coupled to and configured to recive power via the second port of the IC; and
    one or more circuits coupled to, and configured to receive power via, the second power supply node.

8. The portable device of claim 7, wherein the primary power source comprises a first battery and wherein the secondary power source comprises a second battery or a supercapacitor.

9. The portable device of claim 7, further comprising:
    an interface for a user of the portable device to selectively control the portable device to enter a hot swap mode; and
    an indicator configured to indicate to the user that the portable device is in the hot swap mode.

10. A method for signal generation, comprising:

in a normal operating mode:

generating a first output voltage via a switched-mode power supply (SMPS) operated as a buck converter in a forward direction based on an input voltage from a port;

providing the first output voltage to a power output node;

determining whether to enter a swap mode for removing a primary power source;

in the swap mode:

generating a first regulated voltage based on a voltage from a secondary power source;

providing the first regulated voltage to the power output node in response to the determination;

generating a second output voltage via the SMPS operated as a boost converter in a reverse direction; and providing the second output voltage to the port.

11. The method of claim 10, wherein the first regulated voltage is generated at a first terminal of a switch prior to entering the swap mode, a second terminal of the switch being coupled to the power output node, wherein providing the first regulated voltage to the power output node comprises closing the switch in response to the primary power source being removed.

\* \* \* \* \*